(12) United States Patent
Nishiura et al.

(10) Patent No.: US 7,879,947 B2
(45) Date of Patent: Feb. 1, 2011

(54) GAS-BARRIER COMPOSITION, COATING FILM AND METHOD FOR PRODUCTION OF THE SAME, AND LAYERED MATERIAL

(75) Inventors: Katsunori Nishiura, Sodegaura (JP); Kazuyuki Fukuda, Sodegaura (JP); Toshihiko Takaki, Sodegaura (JP)

(73) Assignee: Mitsui Chemicals, Inc., Minato-ku, Tokyo (JP)

( * ) Notice: Subject to any disclaimer, the term of this patent is extended or adjusted under 35 U.S.C. 154(b) by 24 days.

(21) Appl. No.: 12/379,300

(22) Filed: Feb. 18, 2009

(65) Prior Publication Data

US 2009/0171003 A1   Jul. 2, 2009

Related U.S. Application Data

(60) Division of application No. 11/513,147, filed on Aug. 31, 2006, now Pat. No. 7,524,900, which is a continuation of application No. PCT/JP2006/310193, filed on May 23, 2006.

(30) Foreign Application Priority Data

May 24, 2005  (JP)  ............................. 2005-150409
Feb. 23, 2006  (JP)  ............................. 2006-047190

(51) Int. Cl.
| | |
|---|---|
| C08F 8/00 | (2006.01) |
| C08L 3/00 | (2006.01) |
| C08L 33/02 | (2006.01) |
| C08L 33/04 | (2006.01) |
| C08L 33/14 | (2006.01) |
| C08L 35/02 | (2006.01) |
| C08G 18/38 | (2006.01) |

(52) U.S. Cl. .................. 525/195; 525/221; 525/222; 525/223; 524/35; 524/47

(58) Field of Classification Search ............... 525/195, 525/221, 222, 223; 524/35, 47
See application file for complete search history.

(56) References Cited

U.S. PATENT DOCUMENTS

| | | | |
|---|---|---|---|
| 5,683,804 | A | 11/1997 | Nagashima et al. |
| 6,596,807 | B2 | 7/2003 | Oshita et al. |
| 7,252,879 | B2 | 8/2007 | Iwanaga |
| 2002/0055579 | A1 | 5/2002 | Oshita et al. |
| 2004/0058157 | A1 | 3/2004 | Ishikawa |
| 2004/0209090 | A1 | 10/2004 | Iwanaga |
| 2007/0111005 | A1 | 5/2007 | Oshita et al. |

FOREIGN PATENT DOCUMENTS

| | | |
|---|---|---|
| EP | 1176155 A1 | 1/2002 |
| EP | 1690678 A1 | 8/2006 |
| JP | 07-266441 A | 10/1995 |
| JP | 08-041218 A | 2/1996 |
| JP | 09-157580 A | 6/1997 |
| JP | 10-237180 A | 9/1998 |
| JP | 2000-233478 A | 8/2000 |
| JP | 2001-009974 A | 1/2001 |
| JP | 2001-138446 A | 5/2001 |
| JP | 2001-164174 A | 6/2001 |
| JP | 2003 191364 A | 7/2003 |
| JP | 2003-191400 A | 7/2003 |
| JP | 2004-143197 A | 5/2004 |
| JP | 2004-217766 A | 8/2004 |
| JP | 2005-307042 A | 11/2005 |
| WO | WO 2005/053954 A1 | 6/2005 |

OTHER PUBLICATIONS

Office Action issued Nov. 6, 2009, in corresponding Chinese Patent Application No. 200680015616X.
A Supplemental Search Report issued Nov. 2, 2009, in corresponding EP Application No. 06746727.

*Primary Examiner*—Nathan M Nutter
(74) *Attorney, Agent, or Firm*—Buchanan Ingersoll & Rooney PC

(57) ABSTRACT

A composition having gas-barrier properties, which can produce a resin film having gas-barrier properties under high humidity conditions and high abrasion resistance, and a coating film formed by thermally treating a film-like product of the composition having gas-barrier properties and a method for producing the same are provided. A composition having gas-barrier properties, comprising a water-soluble polymer having hydroxyl group (A), a water-soluble polymer having carboxyl group (B), a metal alkoxide and/or a hydrolysis condensate thereof (C), and an esterification catalyst (E), such that the weight ratio of the component (A) and the component (B) is 97/3 to 3/97, and the component (C) is contained in an amount ranging from 1 part by weight to 400 parts by weight, while the component (E) is contained in an amount ranging from 0.01 part by weight to 100 parts by weight, relative to 100 parts by weight of a mixture of the component (A) and the component (B); and a coating film obtained by thermally treating a film-like product of the composition having gas-barrier properties.

4 Claims, No Drawings

GAS-BARRIER COMPOSITION, COATING FILM AND METHOD FOR PRODUCTION OF THE SAME, AND LAYERED MATERIAL

CROSS-REFERENCE TO RELATED APPLICATIONS

The present application is a divisional of application Ser. No. 11/513,147 filed Aug. 31, 2006, which is a continuation of PCT International Application No. PCT/JP2006/310,193 filed May 23, 2006 and designating the U.S., which claims priority from Japanese Patent Application No. 2005-150,409 filed May 24, 2005 and Japanese Patent Application No. 2006-047,190 filed Feb. 23, 2006, the contents of which are incorporated hereinto by reference.

TECHNICAL FIELD

The present invention relates to a gas-barrier composition, a coating film and a method for production of the same, and a layered material.

BACKGROUND ART

Resin films for packaging are required to have various performances such as strength, transparency, formability and the like. In the field of food packaging, in particular, the gas-barrier properties of resin films are considered an important requisite performance needed for long term storage of contents. Among resin films, there are resins composed of a single component and still having the gas-barrier properties. However, in the case where higher gas-barrier properties are required, a resin film having a resin layer laminated on such a resin film described above to further improve the gas-barrier properties, is used. Representative examples of the resin used to improve gas-barrier properties include polyvinylidene chloride (PVDC), which is a chlorinated resin, and polyvinyl alcohol (PVA), which is a water-soluble polymer having hydroxyl group. However, PVDC has problems such as acidic gas generation during an incineration treatment and the like, and thus, substitution by non-chlorinated resins is on demand. PVA is a non-chlorinated resin, and has excellent performance related to the gas-barrier properties in a dry state. However, PVA has a problem that the gas-barrier properties deteriorate upon moisture absorption, and thus is not suitable for the packaging of foodstuffs containing large amounts of moisture.

Furthermore, in addition to the above-described gas-barrier properties, the following properties, for example, are required in general from resin films.

For example, in the case of using resin films as a material for packaging under high humidity conditions, water resistance (water-insolubility) should be necessarily taken into account, along with the gas-barrier properties. In order to enhance the water resistance of PVA to improve the humidity-dependency of the gas-barrier properties, several methods to crosslink PVA with poly(meth)acrylic acid by an esterification reaction have been suggested.

For example, Japanese Patent Laid-Open No. H7-266,441 suggests a method of thermally treating a solution containing PVA and poly(meth)acrylic acid. Japanese Patent Laid-Open No. H8-41,218 suggests a method of thermally treating a solution containing PVA, poly(meth)acrylic acid and a monovalent metal salt such as hypophosphite. Japanese Patent Laid-Open No. H10-237,180 suggests a method of coating an aqueous solution containing PVA and a partial neutralization product of polyacrylic acid or polymethacrylic acid on a film, thermally treating the coated film, and then immersing the coated film in a solution containing metal. These methods attempt to improve the gas-barrier properties and water resistance by reacting the hydroxyl group of PVA with the carboxyl group of poly(meth)acrylic acid.

Japanese Patent Laid-Open No. 2001-164,174 suggests a method of coating an aqueous solution containing, in addition to PVA and polyacrylic acid, a crosslinking material such as an isocyanate compound or the like on a film, and thermally treating the coated film.

Moreover, Japanese Patent Laid-Open No. 2003-191,400 suggests, as a different approach to the improvement of the humidity-dependency of the gas-barrier properties, a composite coating film comprising PVA, poly(meth)acrylic acid, and a metal oxide resulting from hydrolysis and dehydration condensation of a metal alkoxide. This coating film has high gas-barrier properties under high humidity conditions, and thus can be used as a packing material sterilizable by boiling or retorting.

These inventions enhanced the water resistance of resin films, and could improve the humidity-dependency of the gas-barrier properties to some extent.

However, in the above-described methods of the related art, there have been occasions requiring thermal treatment at relatively high temperatures in order to obtain sufficient gas-barrier properties and water resistance. In these cases, improvement was still needed in the aspect of productivity, and a high thermal treatment temperature often caused coloration of the resin and impairment of the resin appearance.

Furthermore, in recent years, there appeared fields requiring even better gas-barrier properties, such as, for example, electronic materials for displays and the like, in addition to the packaging materials. Technologies to cope therewith are demanded. However, when the resins of the related art were to be applied to such fields, there still was room for improvement in the aspect of substrate deformation due to high temperature, in addition to the coloration.

Also, with respect to the use as electric/electronic materials as described above, the resins may need, for example, high transparency and abrasion resistance, in addition to the water resistance and gas-barrier properties required by conventional packaging materials. Transparency is necessary for confirming the contents inside by looking through. Abrasion resistance is necessary for preventing the products from being damaged.

[Patent Document 1] Japanese Patent Laid-Open No. H7-266,441

[Patent Document 2] Japanese Patent Laid-Open No. H8-41,218

[Patent Document 3] Japanese Patent Laid-Open No. H10-237,180

[Patent Document 4] Japanese Patent Laid-Open No. 2001-164,174

[Patent Document 5] Japanese Patent Laid-Open No. 2003-191,400

DISCLOSURE OF THE INVENTION

Layered materials provided with hard coat films on the outermost layer in order to impart abrasion resistance have been conventionally used, but there is no coating material which can simultaneously satisfy the gas-barrier properties and the hard coat characteristics. Development of such coating material would allow use thereof in applications other than the traditional food applications, and would also allow cost reduction or simplification of production processes.

The present invention has been achieved in consideration of such circumstances, and thus provides a composition having gas-barrier properties, which composition is excellently balanced between gas-barrier properties and abrasion resistance.

The inventors of the present invention have devotedly conducted investigations in order to solve the problems mentioned above. As a result, they found that a coating film having gas-barrier properties and high abrasion resistance is obtained by thermally treating a composition having gas-barrier properties. The composition contains a water-soluble polymer having hydroxyl groups (A), a water-soluble polymer having carboxyl groups (B), a metal alkoxide and/or a hydrolysis condensate of a metal alkoxide (C), and an esterification catalyst (E) as the main components, thus completing the invention.

Thus, the invention relates to:

(1) A composition having gas-barrier properties, comprising a water-soluble polymer having hydroxyl groups (A), a water-soluble polymer having carboxyl groups (B), a metal alkoxide and/or a hydrolysis condensate thereof (C), and an esterification catalyst (E), wherein the weight ratio of the component (A) and the component (B) is 97/3 to 3/97, and the component (C) is contained in the amount of not less than 1 part by weight and not more than 450 parts by weight, while the component (E) is contained in the amount of not less than 0.01 parts by weight and not more than 100 parts by weight, relative to 100 parts by weight of a mixture of the component (A) and the component (B);

(2) The composition having gas-barrier properties according to (1), wherein the component (C) is contained in the amount of not less than 1 part by weight and not more than 400 parts by weight;

(3) The composition having gas-barrier properties according to (1) or (2), wherein the weight ratio of the component (A) and the component (B) is 60/40 to 95/5;

(4) The composition having gas-barrier properties according to any one of (1) to (3), further comprising a compound having one or more of a functional group capable of forming a bond with a metal oxide, and one or more of a functional group capable of forming a bond with a carboxyl group respectively in one molecule (D), wherein the component (D) is contained in the amount of not less than 1 part by weight and not more than 20 parts by weight relative to 100 parts by weight of a mixture of the component (A) and the component (B);

(5) The composition having gas-barrier properties according to (4), wherein for the component (D), the functional group capable of forming a bond with a metal oxide is at least one group selected from the group consisting of an alkoxysilyl group, a silanol group, a hydroxyl group, a carboxyl group, an amino group and an ammonium group, while the functional group capable of forming a bond with a carboxyl group is at least one group selected from the group consisting of an amino group, an epoxy group, a thiol group, a hydroxyl group, a urethane-binding group, a urea-binding group and an ammonium group;

(6) The composition having gas-barrier properties according to (4) or (5), wherein the component (D) contains an alkoxysilyl group and an amino group;

(7) The composition having gas-barrier properties according to any one of (4) to (6), wherein the component (D) is at least one selected from the group consisting of 3-aminopropyltrimethoxysilane and 3-aminopropyltriethoxysilane;

(8) The composition having gas-barrier properties according to any one of (1) to (7), wherein the component (E) is at least one compound selected from the group consisting of metal salts of inorganic acids, metal salts of organic acids, organic phosphorus compounds, carboxylic acids and derivatives thereof, sulfonic acids and derivatives thereof, organic ammonium salts or pyridinium salts of mineral acids, cyano group-containing organic compounds, isocyano group-containing organic compounds, ketene derivatives, dichalcogenide compounds, cyanuric chloride, carbonyldiimidazole and hexachloroacetone;

(9) The composition having gas-barrier properties according to any one of (1) to (8), wherein the component (A) is at least one compound selected from the group consisting of polyvinyl alcohol, ethylene-vinyl alcohol copolymers, and saccharides;

(10) The composition having gas-barrier properties according to any one of (1) to (9), wherein the component (B) is poly(meth)acrylic acid or a partially neutralized product thereof;

(11) The composition having gas-barrier properties according to any one of (1) to (10), wherein the component (C) is at least one selected from the group consisting of condensates of alkoxysilane, condensates of alkoxyzirconium, condensates of alkoxyaluminum, and condensates of alkoxytitanium;

(12) The composition having gas-barrier properties according to any one of (1) to (10), wherein the component (C) is at least one selected from the group consisting of an alkoxysilane, an alkoxyzirconium, an alkoxyaluminum and an alkoxytitanium;

(13) The composition having gas-barrier properties according to any one of (1) to (12), further comprising metal oxide particles having an average particle size of 100 nm or less, wherein the metal oxide particles are contained in the amount of not less than 1 part by weight and not more than 100 parts by weight relative to 100 parts by weight of the composition having gas-barrier properties;

(14) The composition having gas-barrier properties according to any one of (1) to (13), wherein the component (C) is a compound which is converted to a metal oxide through a sol-gel reaction upon addition of water and a catalyst;

(15) The composition having gas-barrier properties according to any one of (1) to (14), further comprising a solvent;

(16) The composition having gas-barrier properties according to any one of (1) to (10), wherein the component (A) is polyvinyl alcohol, the component (B) is polyacrylic acid, the component (C) is tetramethoxysilane, and the component (E) is dicyanodiamide;

(17) The composition having gas-barrier properties according to (16), further comprising a compound having one or more of a functional group capable of forming a bond with a metal oxide, and one or more of a functional group capable of forming a bond with a carboxyl group respectively in one molecule (D), wherein the component (D) is 3-aminopropyltrimethoxysilane;

(18) A method for producing the composition having gas-barrier properties according to (4), comprising mixing the component (A), the component (B), the component (D) and the component (E) in a solvent, and mixing the mixture liquid obtained from the previous step and the component (C), wherein during the mixing the mixture liquid and the component (C), a hydrolysis condensation reaction of the component (C) is conducted;

(19) A method for producing the composition having gas-barrier properties according to (4), comprising mixing the component (A), the component (B) and the component (E) in a solvent, and mixing the mixture liquid obtained from the previous step, the component (D) and the component (C), wherein during the mixing the mixture liquid, the component (D) and the component (C), a hydrolysis condensation reaction of the component (C), and a reaction between the component (D) and at least one of a metal oxide and a carboxyl group are conducted;

(20) A method for producing the composition having gas-barrier properties according to (4), comprising mixing the component (A), the component (B) and the component (D) in a solvent, and mixing the mixture liquid obtained from the previous step, the component (E) and the component (C), wherein during the mixing the mixture liquid, the component (E) and the component (C), a hydrolysis condensation reaction of the component (C) is conducted;

(21) A method for producing the composition having gas-barrier properties according to (4), comprising mixing the component (A) and the component (B), and mixing the mixture liquid obtained from the previous step, the component (D), the component (E) and the component (C), wherein during the mixing the mixture liquid, the component (D), the component (E) and the component (C), a hydrolysis condensation reaction of the component (C), and a reaction between the component (D) and at least one of a metal oxide and a carboxyl group are conducted;

(22) A method for producing a coating film, comprising forming a film-like product of the composition having gas-barrier properties according to any one of (1) to (17), and thermally treating the film-like product;

(23) A coating film produced by the method according to (22);

(24) A layered material comprising at least one layer of the coating film according to (23);

(25) The layered material according to (24), wherein the coating film is formed on a base material; and

(26) The layered material according to (24), wherein the coating film and a thermoplastic resin film are laminated.

According to the invention, a composition having gas-barrier properties, which is excellently balanced between gas-barrier properties and abrasion resistance, can be provided.

BEST MODE FOR CARRYING OUT THE INVENTION

The composition (for hard coat) having gas-barrier properties of the present invention comprises:
a water-soluble polymer having hydroxyl groups (A),
a water-soluble polymer having carboxyl groups (B),
a metal alkoxide and/or a hydrolysis condensate thereof (C), and
an esterification catalyst (E).

This composition having gas-barrier properties is suitably used as a composition for coating.

By using the composition having gas-barrier properties of the invention, for example, a coating film (hard coat) is obtained. The coating film according to the invention is a film formed by coating the composition having gas-barrier properties of the invention, and refers to a film in the form of a layer having gas-barrier properties and high abrasion resistance.

The gas-barrier properties refer to the properties of blocking oxygen, water vapor and other gases which accelerate the quality deterioration of the material to be coated. In particular, packaging materials for food, medicine and the like or electronic materials are required to have excellent barrier properties against oxygen gas. According to the invention, the gas-barrier properties of a coating film were evaluated by measuring the oxygen permeability of the coating film.

Furthermore, the abrasion resistance is an index corresponding to hard coat properties, and indicates high surface hardness and excellent abrasion resistance. The surface hardness of plastics is lower compared with inorganic glass, and plastics are susceptible to damages on the surface. A plastic having hard coat properties can replace glass, and its spread for practical use would be further widened.

Hereinafter, the composition having gas-barrier properties, a coating film and a method for producing the same, and a layered material including the coating film of the present invention will be described in detail.

First, the constituent components of the composition having gas-barrier properties will be described.

(A) Water-Soluble Polymer Having Hydroxyl Groups

The water-soluble polymer having hydroxyl groups (A) used for the invention is a polymer containing at least two hydroxyl groups in the polymer chain and exhibiting water-solubility. The water-soluble polymer having hydroxyl groups (A) is preferably at least one compound selected from the group consisting of polyvinyl alcohol, copolymers containing polyvinyl alcohol such as ethylene-vinyl alcohol copolymer and the like, celluloses, and other saccharides. These may be used individually or in combination of two or more species.

Polyvinyl alcohol has at least two or more vinyl alcohol units in the molecule and may be a homopolymer of vinyl alcohol, or a copolymer containing other monomer units. The method for producing polyvinyl alcohol is not particularly limited. A polyvinyl alcohol homopolymer can be obtained by a method involving complete or partial saponification of a polymer of vinyl ester such as, for example, vinyl formate, vinyl acetate or vinyl propionate, or the like. The copolymer can be obtained by a method involving complete or partial saponification of a copolymer of the above-mentioned vinyl ester with an olefin having 2 to 30 carbon atoms both inclusive such as, for example, ethylene, propylene, 1-butene or the like; an unsaturated carboxylic acid having 3 to 30 carbon atoms both inclusive such as, for example, acrylic acid, methacrylic acid, crotonic acid, maleic acid, fumaric acid or the like, or an ester, salt, anhydride or amide thereof; an unsaturated nitrile having 3 to 30 carbon atoms both inclusive such as, for example, acrylonitrile, methacrylonitrile or the like; a vinyl ether having 3 to 30 carbon atoms both inclusive such as, for example, methyl vinyl ether, ethyl vinyl ether or the like; or the like.

For the water-soluble polymer having hydroxyl groups (A) used for the invention, for example, saccharides can be used. The saccharides that can be used include oligosaccharides and polysaccharides. An oligosaccharide refers to a material having a degree of polymerization of saccharide of 2 to 10 both inclusive. The oligosaccharide may be exemplified by sucrose, maltose, isomaltose, cellobiose, lactose or the like. The oligosaccharides may be used individually or in combination of two or more species. A polysaccharide refers to a polymeric compound having a degree of polymerization of saccharide of 10 or greater. The polysaccharide may be exemplified by starch, glycogen, cellulose, pectin, hemicellulose, pectinic acid, alginic acid, carrageenan, agarose or the like. The polysaccharides may be used individually or in combination of two or more species.

Among the water-soluble polymers having hydroxyl groups (A), polyvinyl alcohol or an ethylene-vinyl alcohol copolymer is preferred. The degree of saponification is more preferable as the value approaches 100% in the viewpoint of gas-barrier properties, but it is usually 90% or greater, and preferably 95% or greater. The number average degree of polymerization is usually from 50 to 5000 both inclusive.

Polyvinyl alcohol can be obtained by conducting saponification of a carboxylic acid vinyl polymer during the polycondensation reaction of a metal alkoxide and/or a hydrolysis condensate thereof (C) to be described later. Here, the starting material carboxylic acid vinyl polymer may be exemplified by polyvinyl acetate, polyvinyl propionate or the like. Copolymers with other monomers also can be used. For example, ethylene-vinyl acetate copolymers, ethylene-vinyl propionate copolymers and the like may be mentioned.

(B) Water-Soluble Polymer Having Carboxyl Groups (Group Having Carboxylic Acid)

The water-soluble polymer having carboxyl groups (B) according to the invention is a polymer containing at least two carboxyl groups in the polymer chain and exhibiting water-solubility, and an example thereof is polycarboxylic acid. The water-soluble polymer having carboxyl groups (B) is preferably poly(meth)acrylic acid or a partial neutralization product thereof, more preferably a polymer having at least two or more acrylic acid or methacrylic acid units in the molecule. Even more preferably, the water-soluble polymer having carboxyl groups (B) may be a homopolymer of acrylic acid or methacrylic acid (polyacrylic acid or polymethacrylic acid), or a copolymer of acrylic acid and methacrylic acid, or a copolymer containing other monomer units. These may be used individually or in combination of two or more species.

The method for producing such water-soluble polymer having carboxyl groups (B) is not particularly limited. The poly(meth)acrylic acid homopolymer or the copolymer of acrylic acid/methacrylic acid is obtained by, for example, radical (co)polymerization of acrylic acid or methacrylic acid. Further, the copolymer with other monomers can be obtained by copolymerizing (meth)acrylic acid with an olefin having 2 to 30 carbon atoms both inclusive such as, for example, ethylene, propylene, 1-butene or the like; an aliphatic or aromatic ester, salt, anhydride or amide derived from an unsaturated carboxylic acid having 3 to 30 carbon atoms both inclusive such as, for example, acrylic acid, methacrylic acid, crotonic acid, maleic acid, fumaric acid or the like; an unsaturated nitrile having 3 to 30 carbon atoms both inclusive such as, for example, acrylonitrile, methacrylonitrile or the like; a vinyl ether having 3 to 30 carbon atoms both inclusive such as methyl vinyl ether, ethyl vinyl ether or the like; or the like.

A product obtained by neutralizing all or part of the carboxyl groups (carboxylic acid groups) of poly(meth)acrylic acid with hydroxides of alkali or alkaline earth metals, ammonium hydroxide, an organic ammonium hydroxide or the like, may be also used. The number average molecular weight of such water-soluble polymer having carboxyl groups (B) is usually in the range of 2,000 to 200,000 both inclusive. Among these water-soluble polymers having carboxyl groups (B), poly(meth)acrylic acid or a partial neutralization product thereof is preferred, and polyacrylic acid or a partial neutralization product thereof is particularly preferred.

(C) Metal Alkoxide and/or Partial Hydrolysis Condensate Thereof.

The metal alkoxide according to the invention refers to a compound represented by the following formula (I):

$(R^1)_x M(OR^2)_y$  (1)

in the formula, the substituent represented by $R^1$ represents a hydrogen atom, an alkyl group (for example, a methyl group, an ethyl group, a propyl group, etc.), an aryl group (for example, a phenyl group, a tolyl group, etc.), an organic group containing carbon-carbon double bond (for example, an acryloyl group, a methacryloyl group, a vinyl group, etc.), a halogen-containing group (for example, a halogenated alkyl group such as a chloropropyl group, a fluoromethyl group or the like, etc.), or the like; and $R^2$ represents a lower alkyl group having 1 to 6 carbon atoms both inclusive, preferably 1 to 4 carbon atoms both inclusive. x and y are such that x+y=4, while x represents an integer of 2 or less. M constituting the component (C) is a metal, and examples thereof include silicon, aluminum, zirconium, titanium and the like, which may be used in combination. Inter alia, silicon compounds are relatively easily available at low costs, and undergo a reaction in a mild manner, thus having high potential for industrial use.

The component (C) may be also a compound which is converted to a metal oxide through a sol-gel reaction upon addition of water and catalyst. Specific examples of such compound include alkoxysilanes such as tetramethoxysilane (TMOS), tetraethoxysilane (TEOS), tetrapropoxysilane, tetraisopropoxysilane, methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, dimethyldimethoxysilane, dimethyldiethoxysilane, diphenyldimethoxysilane, diphenyldiethoxysilane, vinyltrimethoxysilane, vinyltriethoxysilane, phenyltrimethoxysilane, phenyltriethoxysilane, p-styryltrimethoxysilane, 3-methacryloxypropylmethyldimethoxysilane, 3-methacryloxypropylmethyldiethoxysilane, 3-methacryloxypropyltrimethoxysilane, 3-methacryloxypropyltriethoxysilane, 3-acryloxypropyltrimethoxysilane, 3-acryloxypropyltriethoxysilane, 3-chloropropyltriethoxysilane, trifluoromethyltrimethoxysilane, trifluoromethyltriethoxysilane and the like, or alkoxyaluminum, alkoxyzirconium, and alkoxytitanium corresponding thereto.

The component (C) may be also at least one selected from the group consisting of alkoxysilanes wherein M in the formula (I) is silicon (Si); alkoxyzirconiumso wherein M is zirconium (Zr); alkoxyaluminums wherein M is aluminum (Al); and alkoxytitanium wherein M is titanium (Ti).

Since the abrasion resistance of a coating film (hard coat) reflects the number of alkoxy groups, it is preferable to use tetrafunctional metal alkoxides such as tetramethoxysilane, tetraethoxysilane and the like. These metal alkoxides and hydrolysis polycondensates of metal alkoxides may be used individually or as a mixture of two or more species.

The hydrolysis condensate of a metal alkoxide is a compound obtained by polycondensing a product obtained by hydrolyzing at least one of those metal alkoxides using an acid or basic compound as a catalyst, and for example, is a partial hydrolysis polycondensate compound of a metal alkoxide. Examples of such compound include at least one selected from condensates of alkoxysilane, condensates of alkoxyzirconium, condensates of alkoxyaluminum, and condensates of alkoxytitanium.

The composition having gas-barrier properties of the invention may also comprising a component (D) as described below, in addition to the components (A) through (C) and (E).

(D) Compound Having One or More of a Functional Group Capable of Forming a Bond with a Metal Oxide, and One or More of a Functional Group Capable of Forming a Bond with a Carboxyl Group Respectively in One Molecule The compound having one or more of a functional group capable of forming a bond with a metal oxide, and one or more of a functional group capable of forming a bond with a carboxyl group respectively in one molecule (D) used for the invention is added to enhance the material dispersibilities of the organic materials, component (A) and component (B), and the inorganic material component (C). With the use of the compound, a coating film having even higher transparency can be obtained.

In the compound having one or more of a functional group capable of forming a bond with a metal oxide, and one or more of a functional group capable of forming a bond with a carboxyl group respectively in one molecule (D) used for the invention, the functional group capable of forming a bond with a metal oxide is specifically a functional group which is capable of forming a bond such as covalent bond, hydrogen bond, ionic bond or the like, with a metal oxide. Examples of the functional group capable of forming a covalent bond with a metal oxide include an alkoxysilyl group, a silanol group and the like, while examples of the functional group capable of forming a hydrogen bond include a hydroxyl group, a carboxyl group, an amino group and the like. Examples of the functional group capable of forming an ionic bond include an ammonium group and the like.

In the compound having one or more of a functional group capable of forming a bond with a metal oxide, and one or more of a functional group capable of forming a bond with a carboxyl group respectively in one molecule (D) used for the invention, the functional group capable of forming a bond with a carboxyl group is specifically a functional group which is capable of forming a bond such as covalent bond, hydrogen bond, ionic bond or the like, with a carboxyl group. Examples of the functional group capable of forming a bond with a carboxyl group include an amino group, an epoxy group, a thiol group and the like, while examples of the functional group capable of forming a hydrogen bond include a monovalent group such as a hydroxyl group, and a divalent group such as a urethane-binding group, a urea-binding group and the like. Examples of the functional group capable of forming an ionic bond include an ammonium group and the like.

In addition, the functional group capable of forming a bond with a metal oxide and the functional group capable of forming a bond with a carboxyl group in one molecule may be the same group. In this case, the component (D) has a plurality of the same group in the molecule. Specifically, the component (D) may be one having a plurality of ammonium groups.

Examples of the compound having one or more of a functional group capable of forming a bond with a metal oxide, and one or more of a functional group capable of forming a bond with a carboxyl group respectively in one molecule (D), include compounds having alkoxysilyl group such as:

compounds having an amino group and an alkoxysilyl group such as 3-aminopropyltrimethoxysilane, 3-aminopropyltriethoxysilane, 3-aminopropylmethyldimethoxysilane, 3-aminopropylmethyldiethoxysilane, N-2-(aminoethyl)-3-aminopropylmethyldimethoxysilane, N-2-(aminoethyl)-3-aminopropyltrimethoxysilane, 2-aminoethylaminomethyltrimethoxysilane, 3-aminopropyldimethylethoxysilane, 2-(2-aminoethylthioethyl)triethoxysilane, p-aminophenyltrimethoxysilane, N-phenyl-3-aminopropylmethyldimethoxysilane, N-phenyl-3-aminopropylmethyldiethoxysilane, N-phenyl-3-aminopropyltrimethoxysilane, N-phenyl-3-aminopropyltriethoxysilane and the like;

compounds having a glycidyl group and an alkoxysilyl group such as 3-glycidoxypropylpropyltrimethoxysilane, 3-glycidoxypropylpropyltriethoxysilane, 3-glycidoxypropylmethyldiethoxysilane and the like;

compounds having a thiol group and an alkoxysilyl group such as 3-mercaptopropylmethyldimethoxysilane, 3-mercaptopropyltrimethoxysilane and the like;

compounds having a ureido group and an alkoxysilyl group such as 3-ureidopropyltrimethoxysilane and the like; and the like, 2-aminoethanol, 3-amino-1-propanol, 2-amino-1-amino-1-butanol, 1-amino-2-butanol, 2-amino-1-butanol, 3-propanediol, 3-amino-1,2-propanediol, 4,2-(2-aminoethoxy)ethanol, 2-amino-2-methyl-1-propanol, 4-amino-2-methylbutanol, 3-aminopropionic acid, 2-aminopropionic acid, 4-amino-n-butyric acid, 5-amino-n-valeric acid, 2-aminoisovaleric acid, asparagine, aspartic acid, ethylenediamine, 2-amino-2-methyl-1,3-propanediol, 2-(2-aminoethylamino) ethanol, 2-aminoethanethiol, 2-aminoethanesulfonic acid, N,N-dimethyl-1,3-propanediamine, N-(3-aminopropyl)cyclohexylamine, 4-picolylamine, 3-picolylamine, 2-picolylamine, 4-(2-aminoethyl)pyridine, 3-(2-aminoethyl)pyridine, 4-aminomethylpiperidine, 1-amino-4-methylpiperazine, 3-amino-5-methylpyrazole, 1-(3-aminopropyl)imidazole, 2-aminoethane-1-sulfonic acid, 3-aminopropanesulfonic acid, sulfanilic acid, 1,4-diaminobutane dihydrogenchloride, 1,5-diaminopentane dihydrogenchloride and the like, but are not limited to these.

Among these compounds, the compounds having an alkoxysilyl group as the functional group capable of forming a bond with a metal oxide, and having an amino group as the functional group capable of forming a bond with a carboxyl group of the component (B) are more preferred. These compounds have good dispersibility and are particularly effective for the purpose of forming transparent coating film. Here, it is further preferable that the component (B) is at least one of 3-aminopropyltrimethoxysilane and 3-aminopropyltriethoxysilane among the above-listed compounds.

(E) Esterification Catalyst

The esterification catalyst (E) according to the invention is a compound catalyzing a reaction for synthesizing an ester from an acid and an alcohol. The acid is an organic acid or an inorganic acid. Such a compound can be used as the esterification catalyst (E) of the invention, but preferably, metal salts of inorganic acids, metal salts of organic acids, organic phosphorus compounds, carboxylic acids and derivatives thereof, sulfonic acids and derivatives thereof, organic ammonium salts or pyridinium salts of mineral acids, cyano group-containing organic compounds, isocyano group-containing organic compounds, ketene derivatives, dichalcogenide compounds, cyanuric chloride, carbonyldiimidazole, and hexachloroacetone may be mentioned.

From the viewpoint that thermal treatment can be performed at low temperatures, organic esterification catalysts containing organic groups which catalyze esterification reactions are even more preferred. Examples of the organic esterification catalyst include organic phosphorus compounds, carboxylic acids and derivatives thereof, sulfonic acids and derivatives, organic ammonium salts or pyridinium salts of mineral acids, cyano group-containing organic compounds, isocyano group-containing organic compounds, ketene derivatives, dichalcogenide compounds, cyanuric chloride, carbonyldiimidazole and hexachloroacetone.

The metal salt of inorganic acid according to the invention may be specifically exemplified by potassium phosphate monobasic, potassium phosphate dibasic, potassium phosphate tribasic, potassium pyrophosphate, potassium polyphosphate, potassium metaphosphate, sodium phosphate monobasic, sodium phosphate dibasic, sodium pyrophosphate, sodium tripolyphosphate, sodium metaphosphate, magnesium phosphate monobasic, magnesium phosphate dibasic, magnesium pyrophosphate, magnesium metaphosphate, calcium pyrophosphate, sodium phosphite, sodium hypophosphite, calcium hypophosphite, magnesium hypophosphite, lithium chloride, sodium chloride, potassium chloride, sodium sulfite, sodium hyposulfite, sodium bromide, or the like.

The metal salt of organic acid according to the invention may be specifically exemplified by sodium acetate, sodium benzoate or the like.

The organic phosphorus compound of the invention includes phosphorus compounds containing trivalent and pentavalent organic groups, and more specifically, includes phosphoric acid monoesters, diesters or trimesters having 1 to 50 carbon atoms both inclusive such as, for example, monobutyl phosphate, dioctyl phosphate, dibutyl phosphate, trioctyl phosphate, triphenyl phosphate, octyldiphenyl phosphate and the like; phosphorous acid monoesters, diesters or trimesters having 1 to 50 carbon atoms both inclusive such as, for example, monophenyl phosphite, dibutyl phosphite, tributyl phosphite, trioctyl phosphite, triphenyl phosphite and the like; aliphatic or aromatic phosphines having 1 to 50 carbon atoms both inclusive such as, for example, tributylphosphine, triphenylphosphine, tris(sulfonatophenyl)phosphine and the like; aliphatic or aromatic phosphine oxides having 1 to 50 carbon atoms both inclusive such as, for example, tributylphosphine oxide, triphenylphosphine oxide and the like; halogenated phosphorus compounds containing organic groups having 1 to 50 carbon atoms both inclusive such as, for example, diphenyl chlorophosphate, triphenylphosphine dichloride, N,N'-bis(2-oxo-3-oxazolidinyl)chlorophosphine and the like; and the like.

The carboxylic acid and derivatives thereof the invention specifically include carboxylic acids, carboxylic acid amides, carboxylic acid imides, carboxylic acid ammonium salts, carboxylic acid pyridinium salts, and carboxylic acid halides.

The carboxylic acid may be any compound among organic compounds having carboxyl group (—COOH group). More specifically, aliphatic or aromatic carboxylic acids having 1 to 30 carbon atoms both inclusive such as, for example, formic acid, acetic acid, propionic acid, caproic acid, lauric acid, benzoic acid, o-toluic acid and the like; aliphatic or aromatic dicarboxylic acids having 2 to 30 carbon atoms both inclusive such as, for example, maleic acid, adipic acid, phthalic acid, isophthalic acid and the like; halogenated aliphatic or aromatic carboxylic acids having 1 to 30 carbon atoms both inclusive such as, for example, chloroacetic acid, trichloroacetic acid, 2-bromopropionic acid, o-chlorobenzoic acid and the like; and the like may be mentioned. Furthermore, such a carboxylic acid may further have other functional group such as a nitro group, an alkoxy group, a hydroxyl group or the like bound thereto.

The carboxylic acid amide is an organic compound having an amide group (—CONR$^1$R$^2$ group, wherein R$^1$ and R$^2$, which may be identical or different, are each H, or an aliphatic or aromatic hydrocarbon group having 1 to 30 carbon atoms both inclusive). Specific examples thereof include the products resulting from conversion of the carboxyl group of the carboxylic acids listed above into an amide group.

The carboxylic acid imide is an organic compound having an imide group ((—CO)$_2$NR group, wherein R is H, or an aliphatic or aromatic hydrocarbon group having 1 to 30 carbon atoms both inclusive) Specific examples thereof include the products resulting from conversion of the carboxyl group of the carboxylic acids listed above into an imide group.

The carboxylic acid ammonium salt is a NH$^{4+}$ or primary, secondary, tertiary or quaternary ammonium salt of a carboxylic acid Specific examples thereof include those having the acidic proton of the carboxylic acids listed above transferred to these ammonium cations.

The carboxylic acid pyridinium salt is a pyridinium salt of a carboxylic acid Specific examples thereof include those having the acidic proton of the carboxylic acids listed above transferred to pyridinium cations.

The carboxylic acid halide is an organic compound having an acid halide group (—COX group, wherein X is F, Cl, Br or I) Specific examples thereof include those resulting from conversion of the carboxyl group of the carboxylic acids listed above into an acid halide group.

The sulfonic acid and derivatives thereof the invention may be specifically exemplified by sulfonic acids, sulfonamides, sulfonimides, sulfonic acid ammonium salts, sulfonic acid pyridinium salts, sulfonimide ammonium salts, sulfonimide pyridinium salts, or sulfonic acid halides.

The sulfonic acid may be any compound among organic compounds having sulfone group (—SO$_3$H group). More specifically, aliphatic or aromatic sulfonic acids having 1 to 30 carbon atoms both inclusive such as, for example, methanesulfonic acid, ethanesulfonic acid, benzenesulfonic acid, p-toluenesulfonic acid and the like; halogenated aliphatic or aromatic sulfonic acids having 1 to 30 carbon atoms both inclusive such as, for example, chloromethanesulfonic acid, trifluoromethanesulfonic acid, chlorobenzenesulfonic acid and the like; and the like may be mentioned. Furthermore, part of the hydrogen atoms of such a sulfonic acid may be substituted with other substituents such as a nitro group, an alkoxy group, a hydroxyl group or the like.

The sulfonamide is an amide compound corresponding to one of the sulfonic acids listed above, and more specifically, sulfonamide compounds derived from sulfonic acid and ammonia, or primary or secondary aliphatic or aromatic amines having 1 to 50 carbon atoms both inclusive such as, for example, p-toluenesulfonic acid amide, mesitylenesulfonic acid anilide, trifluoromethanesulfonic acid-N,N-dimethylamide and the like; alkylsulfonylazole having 1 to 50 carbon atoms both inclusive or arylsulfonylazole having 1 to 50 carbon atoms both inclusive such as, for example, p-toluenesulfonic acid imidazolide, mesitylenesulfonic acid imidazolide, triisopropylbenzenesulfonic acid imidazolide, p-toluenesulfonic acid triazolide, p-toluenesulfonic acid triazolide, ethanesulfonic acid imidazolide and the like; and the like may be mentioned.

The sulfonimide is an imide compound corresponding to one of the sulfonic acids listed above, and more specifically, trifluoromethanesulfonimide, p-toluenesulfonimide, chloromethanesulfonimide and the like may be mentioned.

The sulfonic acid ammonium salt is an ammonium salt corresponding to one of the sulfonic acids listed above. Here, the ammonium cation may be NH$^{4+}$, or may be a primary, secondary, tertiary or quaternary organic ammonium cation. More specifically, tributylammonium triflate (tributylammonium trifluoromethanesulfonate), dimethylphenylammonium triflate, diphenylammonium triflate, triphenylammonium triflate, ammonium p-toluenesulfonate, ammonium trichloroacetate and the like may be mentioned.

The sulfonic acid pyridinium salt is a pyridinium salt corresponding to one of the sulfonic acids listed above. More specifically, for example, pyridinium p-toluenesulfonate, pyridinium trifluoromethanesulfonate, methylpyridinium methanesulfonate, butylpyridinium propionate and the like may be mentioned.

The sulfonimide ammonium salt is an ammonium salt corresponding to one of the sulfonimides listed above. Here, the ammonium cation may be NH$^{4+}$, or may be a primary, secondary, tertiary or quaternary organic ammonium cation. More specifically, for example, diphenylammonium trifluoromethanesulfonimide and the like may be mentioned.

The sulfonimide pyridinium salt is a pyridinium salt corresponding to one of the sulfonimides listed above. More specifically, for example, pyridinium trifluoromethanesulfonimide and the like may be mentioned.

The sulfonic acid halide is an acid halide corresponding to one of the sulfonic acids listed above. More specifically, for example, p-toluenesulfonic acid chloride, mesitylenesulfonic acid chloride, triisopropylbenzenesulfonic acid chloride, trifluoromethanesulfonic acid bromide and the like may be mentioned.

The organic ammonium salt or pyridinium salt of mineral acids of the invention is a salt of mineral acids in which the cation is a primary, secondary, tertiary or quaternary organic ammonium cation or a pyridinium cation. Specifically, for example, diphenylammonium sulfate, tetraethylammonium chloride, pyridinium sulfate and the like may be mentioned.

The cyano group-containing organic compound of the invention is an organic compound having a cyano group (—CN group) bound to a carbon, nitrogen, oxygen or sulfur atom. This organic compound may also have a functional group other than the cyano group in the molecule. Specifically, aliphatic or aromatic nitrile compounds having 1 to 30 carbon atoms both inclusive such as, for example, propionitrile, malononitrile, benzonitrile and the like; halogenated aliphatic or aromatic nitrile compounds having 1 to 30 carbon atoms both inclusive such as, for example, trichloroacetonitrile, bromoacetonitrile, p-chlorobenzonitrile and the like; nitrogen-containing aliphatic or aromatic nitrile compounds having 1 to 30 carbon atoms both inclusive such as, for example, cyanopyridine, tris(2-cyanoethyl)nitromethane and the like; sulfur-containing aliphatic or aromatic nitrile compounds having 1 to 30 carbon atoms both inclusive such as, for example, cyanomethylbenzenesulfonate and the like; aliphatic or aromatic N-cyano compounds having 1 to 50 carbon atoms both inclusive such as, for example, dicyanodiamide, 1-cyanoisourea, N-cyanoformamide, N-cyanoacetamide, 1-cyanobenzotriazole, 1-pyrrolidinecarbonitrile, 4-morpholinecarbonitrile and the like; aliphatic or aromatic O-cyano compounds having 1 to 50 carbon atoms both inclusive such as, for example, p-tolylcyanate and the like; cyanic acid ammonium salts or pyridinium salts such as, for example, tetraethylammonium cyanate, pyridinium cyanate and the like; and the like may be mentioned.

The isocyano group-containing organic compound of the invention is an organic compound having an isocyano group (—NC group) bound to a carbon, nitrogen, oxygen or sulfur atom. This organic compound may also have a functional group other than the isocyano group, in addition to the isocyano group. More specifically, aliphatic or aromatic isocyano compounds having 1 to 30 carbon atoms both inclusive such as, for example, cyclohexyl isocyanide, isopropyl isocyanide, 2,6-dimethylphenyl isocyanide and the like; heteroatom-containing aliphatic or aromatic isocyano compounds having 1 to 30 carbon atoms both inclusive such as, for example, 2-morpholinoethyl isocyanide, diethylisocyanomethyl phosphonate, ethylisocyanoacetate and the like; and the like may be mentioned.

The ketene derivatives of the invention are ketene and organic compounds generating ketene by thermal composition or the like. More specifically, for example, ketene, diketene, ketenediethylacetal, 1,1-bis(methylthio)ethylene, 2,2,6-trimethyl-4H-1,3-dioxin-4-one and the like may be mentioned.

The dichalcogenide compound of the invention is an organic compound having a disulfide group (—SS— group) or a diselenide group (—SeSe— group). More specifically, for example, 2,2'-dipyridyldisulfide, 2,2'-dipyridyldiselenide and the like may be mentioned.

Among such organic esterification catalysts, sulfonic acid and derivatives thereof, and cyano group-containing organic compounds are preferred.

For the composition having gas-barrier properties of the invention, the following may be mentioned as a specific combination of the above-exemplified compounds.

Component (A): polyvinyl alcohol
Component (B): polyacrylic acid
Component (C): tetramethoxysilane
Component (E): dicyanodiamide Furthermore, the following may be mentioned as a specific combination further comprising the component (D) in addition to the above components (A) to (C) and (E).

Component (A): polyvinyl alcohol
Component (B): polyacrylic acid
Component (C): tetramethoxysilane
Component (D): 3-aminopropyltrimethoxysilane or 3-aminopropyltriethoxysilane
Component (E): dicyanodiamide Composition Ratios of Composition Having Gas-Barrier Properties The composition having gas-barrier properties according to the invention comprises a water-soluble polymer having hydroxyl groups (A), a water-soluble polymer having carboxyl groups (B), a metal alkoxide and/or a hydrolysis condensate of a metal alkoxide (C), and an esterification catalyst (E) as essential components. Hereinafter, blending of these components will be described.

The weight ratio of the water-soluble polymer having hydroxyl groups (A) and the water-soluble polymer having carboxyl groups (B) is 97/3 to 3/97, and preferably 60/40 to 95/5, and more preferably 65/35 to 90/10, in view of further enhancing transparency. Also, in the case of containing the component (D), the weight ratio preferably is 90/10 to 10/90, in view of further enhancing water resistance. A relatively higher proportion of the water-soluble polymer having hydroxyl groups (A) leads to higher gas-barrier properties, but water resistance of the coating film has an optimum value determined by the ratio of the components (C) and (D).

When the component (A) is mixed in excess relative to the component (B), the gas-barrier properties of the resulting coating film can be further enhanced, compared with the case of mixing the component (B) in excess. Meanwhile, although the adherence of the coating film to a material to be coated depends on the material to be coated, when the component (B) is mixed in excess relative to the component (A), the adherence of the resulting coating film to the material to be coated can be further enhanced, for some materials to be coated, compared with the case of mixing the component (A) in excess.

The amount of the metal alkoxide and/or the hydrolysis condensate thereof (C) to be used for the invention ranges from 1 part by weight to 450 parts by weight both inclusive, relative to 100 parts by weight of the mixture of the component (A) and component (B). Also, in view of further enhancing the gas-barrier properties and crack resistance, the amount of the component (C) to be used preferably ranges from 20 parts by weight to 400 parts by weight both inclusive, and more preferably from 100 parts by weight to 400 parts by weight both inclusive. When at least one compound selected from the component (C) is used, the resulting coating film exhibits higher gas-barrier properties than the coating film composed only of the components (A) and (B). But there is an optimum value for the gas-barrier performance. Meanwhile, when the amount of the component (C) to be used increases, the coating film tends to have enhanced abrasion resistance. Thus, the amount to be used is determined by balancing between the gas-barrier performance and abrasion resistance.

The esterification catalyst (E) used for the invention is used in an amount ranging from 0.01 part by weight to 100 parts by weight both inclusive, and preferably from 0.1 part by weight to 60 parts by weight both inclusive, relative to 100 parts by weight of the mixture of the components (A) and (B). When too little of the esterification catalyst (E) is used, water resistance is insufficient. While when too much thereof is used, transparency of the resulting coating film is deteriorated. Within the above-mentioned range, a hard coat being excellently balanced between the gas-barrier properties and abrasion resistance can be obtained.

The composition having gas-barrier properties of the invention may further comprise the component (D). Here, the amount of the compound having one or more of a functional group capable of forming a bond with a metal oxide, and one or more of a functional group capable of forming a bond with a carboxyl group respectively in one molecule (D) to be used for the invention ranges, for example, from 0.1 part by weight to 20 parts by weight both inclusive, preferably from 1 part by weight to 20 parts by weight both inclusive, more preferably from 1 part by weight to 15 parts by weight both inclusive, and even more preferably from 1 part by weight to 10 parts by weight both inclusive, relative to 100 parts by weight of the mixture of the components (A) and (B). When too little of the compound having one or more of a functional group capable of forming a bond with a metal oxide, and one or more of a functional group capable of forming a bond with a carboxyl group respectively in one molecule (D) used for the invention, is used, transparency of the resulting coating film is deteriorated. While when too much thereof is used, the storage stability of the composition is deteriorated and is liable to undergo gelation.

In addition, the composition having gas-barrier properties of the invention may further comprise other components.

For example, the composition having gas-barrier properties of the invention may contain a material described in the following, which can act as a catalyst for the hydrolysis polymerization reaction, for the purpose of promoting the reaction in a hydrolysis polycondensation reaction of metal alkoxide. Those used as the catalyst for a hydrolysis polymerization reaction of metal alkoxide are the catalysts used in general sol-gel reactions, which are described in "Recent Technology for Functional Thin Film Production According to Sol-Gel Method" (Hirashima, Hiroshi, Comprehensive Technology Center Co., Ltd., p. 29), "Science of Sol-Gel Method" (Sakka, Sumio, Agne Shofu, p. 154), or the like.

For example, examples of the acid catalyst include inorganic and organic acids such as hydrochloric acid, nitric acid, sulfuric acid, phosphoric acid, acetic acid, oxalic acid, tartaric acid, toluenesulfonic acid and the like. Examples of the alkali catalyst include alkali metal hydroxides such as ammonium hydroxide, potassium hydroxide, sodium hydroxide and the like; quaternary ammonium hydroxides such as tetramethylammonium hydroxide, tetraethylammonium hydroxide, tetrabutylammonium hydroxide and the like; amines such as ammonia, triethylamine, tributylamine, morpholine, pyridine, piperidine, ethylenediamine, diethylenetriamine, ethanolamine, diethanolamine, triethanolamine and the like; aminosilanes such as 3-aminopropyltriethoxysilane, N-(2-aminoethyl)-3-aminopropyltrimethoxysilane and the like; and the like.

In addition to that, organic tin compounds, metal alkoxides such as titanium tetraisopropoxide, diisopropoxytitanium bisacetylacetonate, zirconium tetrabutoxide, zirconium tetrakisacetylacetonate, aluminum triisopropoxide, aluminum trisethylacetonate, trimethoxyborane and the like can be used. From the viewpoint of reactivity, it is preferable to use acid catalysts such as hydrochloric acid, nitric acid and the like, with which the reaction proceeds relatively mildly. A preferred amount of catalyst to be used ranges approximately from 0.001 mole to 0.05 moles both inclusive, preferably from 0.001 mole to 0.04 moles both inclusive, and more preferably from 0.001 mole to 0.03 moles both inclusive, relative to 1 mole of metal alkoxide.

According to the invention, for the purpose of hydrolyzing the metal alkoxide for the metal alkoxide and/or a hydrolysis condensate thereof (C), water may be added to the metal alkoxide and/or a hydrolysis condensate thereof (C). The amount of water to be added is 10 molar equivalents or less, preferably 4 molar equivalents or less, and more preferably 3 molar equivalents or less, based on the total alkoxy groups contained in the metal alkoxide and/or partial hydrolysis polycondensates thereof.

According to the invention, the reaction temperature for the hydrolysis polycondensation of metal alkoxides preferably ranges from 1° C. to 100° C. both inclusive, and more preferably from 20° C. to 60° C. both inclusive. The reaction time preferably ranges approximately from 1 hour to 50 hours both inclusive.

The composition having gas-barrier properties of the invention may further contain metal oxide particles. Addition of metal oxide results in enhancement of the abrasion resistance of the resulting hard coat.

Metal oxide particles refer to the oxide particles containing at least one or more elements selected from silicon, aluminum, titanium, zirconium, indium, tin, zinc and antimony. The average particle size according to the BET method is preferably 1 nm or larger in view of further enhancing abrasion resistance, and 100 nm or smaller in view of further enhancing transparency.

Specific examples of the metal oxide particles include the following.

Silica particles are available from Nissan Chemical Industries, Ltd., under the trade name of Methanol Silica Sol, MA-ST-MA, MEK-ST, MIBK-ST, IPA-ST, IPA-ST-UP, IPA-ST-MS, IPA-ST-L, IPA-ST-ZL, NPC-ST-30, NBA-ST, XBA-ST, EG-ST, DMAC-ST, ST-20, ST-30, ST-40, ST-C, ST-N, ST-O, ST-S, ST-50, ST-20L, ST-OL, ST-XS, ST-XL, ST-YL, ST-ZL, QAS-40, LSS-35, LSS-45, ST-UP, ST-OUP and ST-AK; from Nippon Aerosil Co., Ltd., under the trade name of Aerosil 50, Aerosil 90G, Aerosil 130, Aerosil 200, Aerosil 200V, Aerosil 200CF, Aerosil 200FAD, Aerosil 300, Aerosil 300CF, Aerosil 380, Aerosil R972, Aerosil R972V, Aerosil R972CF, Aerosil 974, Aerosil R202, Aerosil R805, Aerosil R812, Aerosil R812S, Aerosil MOX80, Aerosil MOX170, Aerosil COK84, Aerosil TT600 and Aerosil OX50; and the like.

Alumina particles are available from Nissan Chemical Industries, Ltd., under the trade name of Alumina Sol-100, Alumina Sol-200, Alumina Sol-520 and the like.

Powder and molten material dispersion products of alumina, titanium oxide, indium oxide, tin oxide and zinc oxide are available from CI Kasei Co., Ltd., under the trade name of Nanotek.

These metal oxide particles are contained in an amount ranging from 1 part by weight to 100 parts by weight both inclusive, preferably from 1 part by weight to 60 parts by weight both inclusive, relative to 100 parts by weight of the composition having gas-barrier properties. If too much of the metal oxide microparticles is present, the transparency of the coating film is deteriorated. While if too little of the metal oxide microparticles is present, the effect due to addition thereof is insufficient. Within the above-mentioned range, a hard coat more excellently balanced in transparency, water resistance, gas-barrier properties and abrasion resistance can be obtained.

Composition Having Gas-Barrier Properties Containing Solvent

The composition having gas-barrier properties according to the invention may further contain a solvent. Addition of a solvent facilitates the process of applying the coating material comprising the composition having gas-barrier properties on a resin surface, which is preferable.

The solvent that can be used may be any of water-based solvents or organic solvents, and is not particularly limited as long as the solvent dissolves or disperses the composition having gas-barrier properties of the invention.

More specifically, water;

alcohols having 1 to 30 carbon atoms both inclusive such as, for example, methanol, ethanol, propanol and the like;

aliphatic or aromatic hydrocarbons having 4 to 30 carbon atoms both inclusive such as, for example, n-hexane, n-heptane, toluene, xylene and the like;

halogen-containing aliphatic or aromatic hydrocarbons having 1 to 30 carbon atoms both inclusive such as, for example, dichloromethane, chloroform, chlorobenzene, o-dibromobenzene and the like;

aliphatic or aromatic ethers having 2 to 30 carbon atoms both inclusive such as, for example, diethyl ether, diphenyl ether and the like;

aliphatic or aromatic esters having 2 to 30 carbon atoms both inclusive such as, for example, ethyl acetate, butyl propionate and the like;

aliphatic or aromatic amide compounds having 2 to 30 carbon atoms both inclusive such as, for example, dimethylformamide, dimethylacetamide and the like; and aliphatic or aromatic nitriles having 2 to 30 carbon atoms both inclusive such as, for example, acetonitrile, benzonitrile and the like may be mentioned. These solvents may be used individually or as a mixed solvent of two or more species.

Among these solvents, particularly water or a mixed solvent of water and alcohol is preferred. For the alcohol, methanol, ethanol, propanol, isopropanol and the like are preferred, and the mixing ratio of water to alcohol is preferably 2/8 to 8/2 as a weight ratio.

The amount of the solvent to be used is not particularly limited, but is preferably in the range of, for example, from 1 part by weight to 1,000,000 parts by weight both inclusive, and more preferably in the range of from 10 parts by weight to 10,000 parts by weight both inclusive, relative to 100 parts by weight of a mixture of the water-soluble polymer having hydroxyl groups (A) and the water-soluble polymer having carboxyl groups (B).

Next, the method for producing the composition having gas-barrier properties will be described.

The composition having gas-barrier properties according to the invention is prepared by, for example, mixing a solution containing the water-soluble polymer having hydroxyl groups (A) and the water-soluble polymer having carboxyl groups (B) dissolved in any of the above-mentioned solvents, with the metal alkoxide and/or a hydrolysis condensate of metal alkoxide (C) and the esterification catalyst (E).

For the component (A), component (B) and component (C), the order of mixing is not particularly limited. The mixing can be conducted in an arbitrary order, such as addition of the component (C) to a mixture liquid of the component (A) and component (B), addition of the component (B) to a mixture of the component (A) and component (C), addition of the component (A) to a mixture of the component (B) and component (C), or the like.

Furthermore, in the case of adding a catalyst for the sol-gel reaction to produce an oxide solid by conducting a hydrolysis polycondensation reaction of the component (C), solidifying a sol to a gel, and heating the gel, the catalyst may be added after dissolving in or diluting with water in advance. The reaction of the component (C) is conducted such that the component (C) is reacted alone, and then added to the component (A) or component (B), or a mixture thereof. Alternatively, a method of mixing the component (C) first with the component (A) and reacting, and then mixing the result with the component (B); or a method of mixing the component (C) first with the component (B) and reacted, and then mixing the result with the component (A); or the like is employed.

When a compound having one or more of a functional group capable of forming a bond with a metal oxide, and one or more of a functional group capable of forming a bond with a carboxyl group respectively in one molecule (D) is contained, the component (D) can be added at any time point in the above procedures in relation to the components (A) to (C). However, when the functional group capable of forming a bond with a metal oxide is an alkoxysilyl group, 1. a method of mixing a solution prepared by adding dropwise a compound having one or more of a functional group capable of forming a bond with a metal oxide, and one or more of a functional group capable of forming a bond with a carboxyl group respectively in one molecule (D), to a solution containing a water-soluble polymer having hydroxyl groups (A) and a water-soluble polymer having a carboxyl groups (B) dissolved in any of the above-mentioned solvents, and mixing with stirring; and a metal alkoxide and/or a hydrolysis condensate of metal alkoxide (C), or a solution prepared by adding a catalyst and water to (C) and stirring for a certain length of time, immediately before use, and then conducting a reaction at a predetermined temperature for a predetermined time to prepare a composition;

2. a method of mixing a solution prepared by adding dropwise a compound having one or more of a functional group capable of forming a bond with a metal oxide, and one or more of a functional group capable of forming a bond with a carboxyl group respectively in one molecule (D), to a solution containing a dissolved water-soluble polymer having carboxyl groups (B), and mixing with stirring, and then adding a solution containing a dissolved water-soluble polymer having hydroxyl groups (A) thereto; and a metal alkoxide and/or a hydrolysis condensate of metal alkoxide (C), or a solution prepared by adding a catalyst and water to (C) and stirring for a certain length of time, immediately before use, and then conducting a reaction at a predetermined temperature for a predetermined time to prepare a composition;

and the like may be mentioned, and any of the methods may be carried out without any problem.

In addition, the esterification catalyst (E) may be added at any time, for example, if in the presence of a solution of the component (A) or component (B).

The method for producing the composition having gas-barrier properties of the invention is not particularly limited. Preferably, methods (i) to (viii) described below and in Table 4, more preferably methods (i) to (iv), are used. Furthermore, the following are examples of the methods for producing the composition having gas-barrier properties containing the component (D).

(i) A method comprising the steps of mixing the component (A), the component (B), the component (D) and the component (E) in a solvent, and mixing the mixture liquid obtained from the previous step and the component (C), wherein during the step of mixing the mixture liquid and the component (C), a hydrolysis condensation reaction of the component (C) is conducted.

(ii) A method comprising the steps of mixing the component (A), the component (B) and the component (E) in a solvent, and mixing the mixture liquid obtained from the previous step, the component (D) and the component (C), wherein during the step of mixing the mixture liquid, the component (D) and the component (C), a hydrolysis condensation reaction of the component (C) is conducted.

(iii) A method comprising the steps of mixing the component (A), the component (B) and the component (D) in a solvent, and mixing the mixture liquid obtained from the previous step, the component (E) and the component (C), wherein during the step of mixing the mixture liquid, the component (E) and the component (C), a hydrolysis condensation reaction of the component (C) is conducted.

(iv) A method comprising the steps of mixing the component (A) and the component (B), and mixing the mixture liquid obtained from the previous step, the component (D), the component (E) and the component (C), wherein during the step of mixing the mixture liquid, the component (D), the component (E) and the component (C), a hydrolysis condensation reaction of the component (C), and a reaction between the component (D) with at least one of a metal oxide and a carboxyl group are conducted.

(v) A method comprising the steps of mixing the component (A), the component (B), the component (D) and the component (E), and mixing the mixture liquid obtained from the previous step, and a solution prepared by adding a catalyst and water to the component (C) and stirring for a certain length of time, wherein during the step of mixing the mixture liquid, and a solution prepared by adding a catalyst and water to the component (C) and stirring for a certain length of time, a hydrolysis condensation reaction of the component (C) is further conducted.

(vi) A method comprising the steps of mixing the component (A), the component (B) and the component (E) in a solvent, and mixing the mixture liquid obtained from the previous step, the component (D), and a solution prepared by adding a catalyst and water to the component (C) and stirring for a certain length of time, wherein during the step of mixing the mixture liquid, the component (D) and the solution prepared by adding a catalyst and water to the component (C) and stirring for a certain length of time, a hydrolysis condensation reaction of the component (C) is further conducted, and at the same time, a reaction between the component (D) and at least one of a metal oxide and a carboxyl group is conducted.

(vii) A method comprising the steps of mixing the component (A), the component (B) and the component (D) in a solvent, and a mixing the mixture liquid obtained from the previous step, the component (E) and a solution prepared by adding a catalyst and water to the component (C) and stirring for a certain length of time, wherein during the step of mixing the mixture liquid, the component (E) and the solution prepared by adding a catalyst and water to the component (C) and stirring for a certain length of time, a hydrolysis condensation reaction of the component (C) is further conducted.

(viii) A method comprising the steps of mixing the component (A) and the component (B), and mixing the mixture liquid obtained from the previous solution, the component (D), the component (E) and a solution prepared by adding a catalyst and water to a component (C) and stirring for a certain length of time, wherein during the step of mixing the mixture liquid, the component (D), the component (E) and the solution prepared by adding a catalyst and water to the component (C) and stirring for a certain length of time, a hydrolysis condensation reaction of the component (C) is further conducted, and at the same time, a reaction between the component (D) and at least one of a metal oxide and a carboxyl group is conducted.

For the methods (ii), (iv), (vi) and (viii), with respect to the reaction between the component (D) and at least one of a metal oxide and a carboxyl group, it is preferable that the component (D) is reacted with both of the metal oxide and the carboxyl group. Also, the reaction of the component (D) is specifically a reaction to bind with at least one of a metal oxide and a carboxyl group, and it is preferable for the component (D) to bind to both of the metal oxide and the carboxyl group.

Coating Film (Gas-Barrier Hard Coat, Gas-Barrier Film)

The coating film of the invention is produced by forming a film-like product of the composition having gas-barrier properties of the invention and thermally treating the film-like product.

A film-like product refers to the status in which a composition covers the surface of a base material. The method of forming a film-like product is not particularly limited. For example, a method of flow casting the composition having gas-barrier properties on a support such as glass plate, metal plate, thermoplastic resin film or the like, and drying, and the like are available. A film-like product is formed on a support to a desired thickness, and then thermal treatment is carried out. The temperature for thermal treatment is preferably in the range of from 50° C. to 250° C. both inclusive, more preferably in the range of from 80° C. and 200° C. both inclusive, and even more preferably in the range of from 80° C. to 150° C. both inclusive. According to the invention, it is also possible, for example, to exhibit high gas-barrier properties at lower temperatures by using an esterification catalyst (E). By performing a thermal treatment at a lower temperature, coloration of the coating film can be suppressed. When a thermoplastic resin film is used as the support, it is also possible to produce a coating film on a low-melting-point resin film. The time for the thermal treatment is usually one second or longer.

The film thickness of the coating film of the invention ranges from 0.01 μm to 100 μm both inclusive, preferably from 0.1 μm to 70 μm both inclusive. If the film thickness is too large, there is a possibility of cracks forming in the coating film.

The coating film formed from the composition having gas-barrier properties according to the invention has excellent gas-barrier properties against gases, water vapor and the like. To mention a specific example of the gas-barrier properties of the gas-barrier hard coat of the invention, when a coating film having a film thickness of about 1 to 2 μm is formed on a polyethylene terephthalate film of 50 μm in thickness, the oxygen permeability measured at a temperature of 23° C. and a humidity of 90% using an oxygen permeability measuring device (Oxtran 2/21 MH manufactured by Mocon, Inc.) is 0.01 to 30 (cc/m$^2$·day·atm), and preferably 0.01 to 25 (cc/m$^2$·day·atm)).

Here, the gas-barrier properties change significantly with the amount of the component (C) added. For example, when tetramethoxysilane is used as the component (C), if the silica (SiO$_2$) content is less than 54%, the oxygen permeability is 0.01 to 30 (cc/m$^2$·day·atm), and preferably 0.01 to 25 (cc/m$^2$·day·atm). If the silica (SiO$_2$) content is 54% or greater, the oxygen permeability is less than 0.5 (cc/m$^2$·day·atm).

The gas-barrier properties also change with the weight ratio of the component (A) and the component (B). For example, when the silica (SiO$_2$) content is 54% or greater, and the proportion occupied by the component (A) in the weight ratio of the component (A) and component (B) is 60% or greater, the oxygen permeability is less than 0.4 (cc/$m^2 \cdot day \cdot atm$). Further, when the silica ($SiO_2$) content is 54% or greater, and the proportion occupied by the component (A) in the weight ratio of the component (A) and component (B) is less than 60%, the oxygen permeability is less than 0.5 (cc/$m^2 \cdot day \cdot atm$).

The abrasion resistance of the gas-barrier hard coat of the invention in the case of using glass for the substrate is, for example, 6H to 9H, preferably 7H to 9H, according to the pencil hardness test. The abrasion resistance in the case of using polycarbonate for the substrate is, for example, B to 4H, preferably HB to 4H, according to the pencil hardness test.

The layered material (gas-barrier layered film, hard coat layered material) of the invention is a layered material including at least one layer of the coating film of the invention. Specifically, (i) a layered material in which the coating film of the invention is formed on a substrate, and (ii) a layered material in which the coating film of the invention and a thermoplastic resin film are laminated may be mentioned.

For (i) in the above, specifically an insulating substrate, a semiconductor substrate and a metal substrate can be mentioned for the substrate. The insulating substrate may be exemplified by a glass substrate, or an organic resin substrate such as a polycarbonate substrate or the like.

For (ii), specifically a multilayered film of the coating film of the invention and an other plastic film can be mentioned. More specifically, a laminate consisting of the coating film of the invention and at least two layers of thermoplastic resin film can be mentioned.

The type of the thermoplastic resin film used is not particularly limited, as long as the film is a film of a resin having thermoplasticity, and any known, conventionally used films can be used. Specifically, polyolefin resin films of, for example, polyethylene, polypropylene, cycloolefin copolymers and the like; polyamide resin films of, for example, nylon 6, nylon 66 and the like; polyester resin films of, for example, polyethylene terephthalate, polyethylene naphthalate and the like; and the like may be mentioned. Or, films formed from mixtures of these resins, or laminates of such films may be also used. These films may be non-stretched films or stretched films.

The method of obtaining the layered material of the invention is not particularly limited. Known stacking methods such as a coating method, a dry laminating method, an extrusion coating method and the like can be employed.

In the coating method, a layered material of laminated films and the like can be obtained by, for example, coating the coating material of the invention on a thermoplastic film to a desired thickness, and subjecting the result to thermal treatment. The method of coating of the coating material comprising the composition having has barrier properties on a thermoplastic resin film is not particularly limited, and the process can be carried out by any conventional method. The coating material may be applied on a thermoplastic resin film after biaxial stretching, and then thermal treatment may be conducted. Further, the coating material may be applied on a non-stretched film, and then biaxial stretching and thermal treatment may be conducted. Also, the coating material may be applied after uniaxial stretching in the machine direction of a resin film, subsequently stretching the film in the width direction, and then thermal treatment may be conducted.

In the dry laminating method, the coating film of the invention and a thermoplastic resin film can be adhered by any known method. In the extrusion coating method, a thermoplastic resin is melt extruded on the coating film of the invention to obtain a laminated film.

It is also possible to further enhance the gas-barrier properties by further combining the layered material of the invention with a vapor deposited layer of Si, Al or the like.

According to the invention, the coating film obtained from the composition having gas-barrier properties has abrasion resistance, in addition to the gas-barrier properties under high humidity conditions. It has been a practice to stack a gas-barrier coat film and a hard coat film in order to impart these properties on a base material. However, according to the invention, it is also possible to obtain properties equivalent to the properties of a laminated film by, for example, one time coating.

Furthermore, it is also possible to obtain, for example, a composition for gas-barrier hard coat which can produce a resin film having transparency, gas-barrier properties under high humidity conditions and high abrasion resistance, at a thermal treatment temperature lower than conventional thermal treatment temperatures, and a gas-barrier hard coat formed by thermally treating a film-like product of the composition for hard coat and a method for production thereof.

Moreover, it is also possible, for example, to enhance transparency or water resistance. It is also possible, for example, to obtain a constitution not susceptible to coloration. The resulting coating films may be specifically used for the following applications.

1. Coating Material for Photochromic Compound-Containing Resin

So-called photochromic compounds, which absorb light in the ultraviolet region and develop color or change color, are traditionally known. Photochromic compound-containing resins having such photochromic compounds added to resins are widely used, and are used in, for example, glass for automobiles and glass windows after being formed into thin films between glass sheets. Furthermore, the resins are used in photochromic lenses after being incorporated into the material for spectacle lenses or being formed on the lenses. A photochromic lens is a lens which rapidly undergoes coloration in the open air under the ultraviolet light included in the sunlight to function as sunglasses, while undergoes decoloration indoors to function as usual transparent glasses. Such photochromic products have a problem that the coloration-decoloration activity in correspondence to the irradiation of ultraviolet light is not sustained. The cause is believed to be the deterioration of photochromic compounds due to the ultraviolet light or the contact with oxygen and moisture in the atmosphere. Therefore, these products are required to have durability that can sustain the coloration-decoloration activity even after long-term use under high humidity conditions. For such applications, it is contemplated that when the coating material of the invention is formed on the photochromic products, the coating material can block gases in the atmosphere and suppresses deterioration of the photochromic compounds. In particular, the photochromic lenses are stacked with a hard coat layer to prevent damage of the lenses. However, since the coating film of the invention exhibits the hard coat performance as well as the gas-barrier performance, stack of a hard coat film is unnecessary.

2. Coating Material for Display Substrate

For display substrates, glass has been traditionally used In recent years, the weight of the trend is being transferred to plastics, which have features of being thin, lightweight and not breaking, in order to cope with miniaturization and weight reduction of displays. While plastics have such features, they have problems in the aspects of gas-barrier properties, dimensional stability, heat resistance, chemical resistance, low water absorption properties, optical anisotropy and the like, and abrasion resistance. In particular, since the gas-barrier properties cause problems such as display defects and the like due to penetration of water vapor and oxygen into the display devices, high performance is required. When the coating film of the invention is stacked on a display substrate, the coating film will block gases in the atmosphere and thus can suppress deterioration of display devices. Furthermore, hard coat performance can be imparted to the substrate.

Heretofore, embodiments of the present invention have been described, but they are for the illustrative purposes only. Various constitutions other than the described embodiments can be also employed.

For example, the water-soluble polymer having hydroxyl groups (A) and the water-soluble polymer having carboxyl groups (B) may be copolymers of vinyl alcohol and (meth) acrylic acid. In this case, the weight ratio of the vinyl alcohol part and the acrylic acid part in the copolymer is in the range of 97/3 to 3/97, and preferably 60/40 to 95/5.

The water-soluble polymer having hydroxyl groups (A) or the water-soluble polymer having carboxyl groups (B) may be polymers containing carboxyl group and hydroxyl group.

EXAMPLES

Hereinafter, examples of the present invention will be described. In addition, the invention is definitely not limited to the related examples. It is possible to adopt various alterations and modifications within the technical scope understood from the description of the claims.

Example 1

Preparation of Composition (for Hard Coat) Having Gas-Barrier Properties

Aqueous Solution of Polyvinyl Alcohol

To 5 parts by weight of completely saponified type (average degree of polymerization: about 400 to 600) polyvinyl alcohol (PVA) 500 manufactured by Wako Pure Chemical Industries, Ltd. as component (A), 95 parts by weight of distilled water was added. PVA was melted by heating to obtain an aqueous solution of 5 wt % PVA.

Aqueous Solution of Polyacrylic Acid

To 20 parts by weight of an aqueous solution (25%) of polyacrylic acid (PAA) (viscosity: 8000 to 12000 cP (30° C.)) manufactured by Wako Pure Chemical Industries, Ltd. as component (B), 80 parts by weight of distilled water was added to obtain an aqueous solution of 5 wt % PAA.

In addition, for the following Examples and Comparative Examples, such aqueous solutions were used as the aqueous solutions containing the component (A) and component (B), respectively.

While stirring 1000 parts by weight of an aqueous solution of 5 wt % PAA, 38 parts by weight of a solution containing 3-aminopropyltrimethoxysilane (APTMOS) as component (D) and ethanol mixed at a weight ratio of 1:9 was added dropwise. Then the mixture was stirred at room temperature for 30 minutes. Subsequently, 1000 parts by weight of an aqueous solution of 5 wt % PVA, and 14.5 parts by weight of dicyanodiamide as component (E) were added to the mixture, and the resulting mixture was stirred for another 10 minutes. Subsequently, 355 parts by weight of tetramethoxysilane (TMOS) as component (C) was added thereto, and the resulting mixture was stirred at room temperature for 1.5 hours to obtain a composition having gas-barrier properties.

Production of Coating Film (Hard Coat)

The composition prepared by the above-described method was coated on a glass substrate having a thickness of 2 mm using a bar coater, so that the thickness after curing was about 1.5 μm. Then, the substrate was heated at a low temperature (110° C.) for 2 hours to prevent coloration or deformation of the substrate, thus to obtain a coating film. In the same manner, the same composition was coated on a PET (polyethylene terephthalate) substrate (Cosmoshine A4100 manufactured by Toyobo Co., Ltd.) having a thickness of 50 μm and heated to obtain a coating film.

Example 2

1000 parts by weight of an aqueous solution of 5 wt % PVA as component (A), 1000 parts by weight of an aqueous solution of 5 wt % PAA as component (B), and 14.5 parts by weight of dicyanodiamide as component (E) were mixed and stirred at room temperature for 10 minutes. Subsequently, 355 parts by weight of tetramethoxysilane as component (C) was added thereto, and the mixture was stirred at room temperature for 1.5 hours to obtain a composition having gas-barrier properties. By using this composition, and heating a substrate coated therewith, in the same manner as in Example 1, at a low temperature (110° C.) for 2 hours to prevent coloration or deformation of the substrate, a coating film was obtained.

Example 3

While stirring 1400 parts by weight of an aqueous solution of 5 wt % PAA, 52 parts by weight of a solution containing 3-aminopropyltrimethoxysilane as component (D) and ethanol mixed at a weight ratio of 1:9 was added dropwise thereto. Then the mixture was stirred at room temperature for 30 minutes. Subsequently, 600 parts by weight of an aqueous solution of 5 wt % PVA, and 22.8 parts by weight of dicyanodiamide as component (E) were added to the mixture, and the resulting mixture was stirred for another 10 minutes. Subsequently, 377 parts by weight of tetramethoxysilane as component (C) was added thereto, and the resulting mixture was stirred at room temperature for 1.5 hours to obtain a composition having gas-barrier properties. By using this composition, and heating a substrate coated therewith, in the same manner as in Example 1, at a low temperature (110° C.) for 2 hours to prevent coloration or deformation of the substrate, a coating film was obtained.

Example 4

600 parts by weight of an aqueous solution of 5 wt % PVA as component (A), 1400 parts by weight of an aqueous solution of 5 wt % PAA as component (B), and 22.8 parts by weight of dicyanodiamide as component (E) were mixed and stirred at room temperature for 10 minutes. Subsequently, 377 parts by weight of tetramethoxysilane as component (C) was added thereto, and the mixture was stirred at room temperature for 1.5 hours to obtain a composition having gas-barrier properties. By using this composition, and heating a substrate coated therewith, in the same manner as in Example 1, at a low temperature (110° C.) for 2 hours to prevent coloration or deformation of the substrate, a coating film was obtained.

Example 5

While stirring 1400 parts by weight of an aqueous solution of 5 wt % PAA, 52 parts by weight of a solution containing 3-aminopropyltrimethoxysilane as component (D) and ethanol mixed at a weight ratio of 1:9 was added dropwise thereto. Then the mixture was stirred at room temperature for 30 minutes. Subsequently, 600 parts by weight of an aqueous solution of 5 wt % PVA was added to the mixture, and the resulting mixture was stirred for another 10 minutes. The result was referred to as Solution e51. Meanwhile, 60 parts by weight of a 0.06 N aqueous solution of nitric acid was added to 252 parts by weight of tetramethoxysilane as component (C), and the resulting mixture was stirred at room temperature for 1 hour. The result was referred to as Solution e52.

The Solution e51 and Solution e52 were mixed and stirred at room temperature for 2 hours. Subsequently, 34 parts by weight of dicyanodiamide as component (E) was added to the mixture to obtain a composition. By using this composition, and heating a substrate coated therewith, in the same manner as in Example 1, at a low temperature (120° C.) for 1 hour to prevent coloration or deformation of the substrate, a coating film was obtained.

Example 6

1600 parts by weight of an aqueous solution of 5 wt % PVA as component (A), 400 parts by weight of an aqueous solution of 5 wt % PAA as component (B), and 11.6 parts by weight of dicyanodiamide as component (E) were mixed and stirred at room temperature for 10 minutes. Subsequently, 377 parts by weight of tetramethoxysilane as component (C) was added thereto, and the mixture was stirred at room temperature for 1.5 hours to obtain a composition having gas-barrier properties. By using this composition, and heating a substrate coated therewith, in the same manner as in Example 1, at a low temperature (110° C.) for 2 hours to prevent coloration or deformation of the substrate, a coating film was obtained.

Example 7

1400 parts by weight of an aqueous solution of 5 wt % PVA as component (A), 600 parts by weight of an aqueous solution of 5 wt % PAA as component (B), and 22.8 parts by weight of dicyanodiamide as component (E) were mixed and stirred at room temperature for 10 minutes. Subsequently, 368 parts by weight of tetramethoxysilane as component (C) was added thereto, and the mixture was stirred at room temperature for 1.5 hours to obtain a composition having gas-barrier properties. By using this composition, and heating a substrate coated therewith, in the same manner as in Example 1, at a low temperature (110° C.) for 2 hours to prevent coloration or deformation of the substrate, a coating film was obtained.

Example 8

To 1400 parts by weight of an aqueous solution of 5 wt % PAA, 600 parts by weight of an aqueous solution of 5 wt % PVA, and 22.8 parts by weight of dicyanodiamide as component (E) were added and stirred for 10 minutes, thus to obtain a solution referred to as Solution e81. Meanwhile, to 377 parts by weight of tetramethoxysilane as component (C), 52 parts by weight of a solution containing 3-aminopropyltrimethoxysilane as component (D) and ethanol mixed at a weight ratio of 1:9 was added, and the resulting mixture was stirred at room temperature for 10 minutes. The result was referred to as Solution e82.

The Solution e81 and Solution e82 were mixed and stirred at room temperature for 1.5 hours. By using this composition, and heating a substrate coated therewith, in the same manner as in Example 1, at a low temperature (110° C.) for 2 hours to prevent coloration or deformation of the substrate, a coating film was obtained.

Example 9

To 1400 parts by weight of an aqueous solution of 5 wt % PAA, 600 parts by weight of an aqueous solution of 5 wt % PVA, and 52 parts by weight of a solution containing 3-aminopropyltrimethoxysilane as component (D) and ethanol mixed at a weight ratio of 1:9 were added and stirred for 10 minutes, thus to obtain a solution referred to as Solution e91. Meanwhile, to 377 parts by weight of tetramethoxysilane as component (C), 22.8 parts by weight of dicyanodiamide as component (E) and 750 parts by weight of methanol were added, and then the resulting mixture was stirred at room temperature for 30 minutes. The result was referred to as Solution e92.

The Solution e91 and Solution e92 were mixed and stirred at room temperature for 1.5 hours. By using this composition, and heating a substrate coated therewith, in the same manner as in Example 1, at a low temperature (110° C.) for 2 hours to prevent coloration or deformation of the substrate, a coating film was obtained.

Example 10

1400 parts by weight of an aqueous solution of 5 wt % PAA and 600 parts by weight of an aqueous solution of 5 wt % PVA were mixed. This mixture was referred to as Solution e101. Meanwhile, to 377 parts by weight of tetramethoxysilane as component (C), 52 parts by weight of a solution containing 3-aminopropyltrimethoxysilane as component (D) and ethanol mixed at a weight ratio of 1:9, 22.8 parts by weight of dicyanodiamide as component (E), and 750 parts by weight of methanol were added. Then the resulting mixture was stirred at room temperature for 30 minutes. The result was referred to as Solution e102.

The Solution e101 and Solution e102 were mixed and stirred at room temperature for 1.5 hours. By using this composition, and heating a substrate coated therewith, in the same manner as in Example 1, at a low temperature (110° C.) for 2 hours to prevent coloration or deformation of the substrate, a coating film was obtained.

Example 11

While stirring 1400 parts by weight of an aqueous solution of 5 wt % PAA, 52 parts by weight of a solution containing 3-aminopropyltrimethoxysilane as component (D) and ethanol mixed at a weight ratio of 1:9 was added dropwise thereto. Then the mixture was stirred at room temperature for 30 minutes. Subsequently, 600 parts by weight of an aqueous solution of 5 wt % PVA was added to the mixture, and the resulting mixture was stirred for another 10 minutes. The result was referred to as Solution e111. Meanwhile, to 377 parts by weight of tetramethoxysilane as component (C), 20 parts by weight of a 0.06 N aqueous solution of nitric acid was added, and the mixture was stirred at room temperature for 1.5 hours. The result was referred to as Solution e112.

The Solution e111 and Solution e112 were mixed and stirred at room temperature for 2 hours. Subsequently, 22.8 parts by weight of dicyanodiamide as component (E) was added to the mixture to obtain a composition. By using this composition, and heating a substrate coated therewith, in the same manner as in Example 1, at a low temperature (110° C.)

for 2 hours to prevent coloration or deformation of the substrate, a coating film was obtained.

Example 12

Preparation of Cycloolefin Copolymer Film

A random copolymer of tetracyclo[4.4.12,5.17,10.0]-dodeca-3-ene (TCD-3) and ethylene (molar ratio=30:70, glass transition temperature: 125° C., average refractive index: 1.54, water absorption: 0.01%) was used as an addition copolymer of a norbornene-based monomer and an olefin-based monomer, to conduct melt extrusion molding using a single-screw extruder (diameter: 40 mm) at a cylinder temperature of 280° C. Thus, a cycloolefin copolymer film having a film thickness of 100 μm was produced.

Preparation of Composition Having Gas-Barrier Properties

While stirring 1400 parts by weight of an aqueous solution of 5 wt % PAA, 52 parts by weight of a solution containing 3-aminopropyltrimethoxysilane as component (D) and ethanol mixed at a weight ratio of 1:9 was added dropwise thereto. Then the mixture was stirred at room temperature for 30 minutes. Subsequently, 600 parts by weight of an aqueous solution of 5 wt % PVA and 22.8 parts by weight of dicyanodiamide as component (E) were added to the mixture, and the resulting mixture was stirred for another 10 minutes. Subsequently, 377 parts by weight of tetramethoxysilane as component (C) was added thereto, and the resulting mixture was stirred at room temperature for 1.5 hours to obtain a composition having gas-barrier properties. By using this composition, and heating a substrate coated therewith, in the same manner as in Example 1, at a low temperature (110° C.) for 2 hours to prevent coloration or deformation of the substrate, a coating film was obtained.

The composition prepared by the method described above was coated on the cycloolefin copolymer film produced by the method described above using a bar coater, so that the thickness after curing was about 1.5 μm. Then, the coated substrate was heated at a low temperature (110° C.) for 2 hours to prevent coloration or deformation of the substrate, thus to obtain a coating film.

Example 13

While stirring 1400 parts by weight of an aqueous solution of 5 wt % PAA, 52 parts by weight of a solution containing 3-aminopropyltrimethoxysilane as component (D) and ethanol mixed at a weight ratio of 1:9 was added dropwise thereto. Then the mixture was stirred at room temperature for 30 minutes. Subsequently, 600 parts by weight of an aqueous solution of 5 wt % PVA and 22.8 parts by weight of dicyanodiamide as component (E) were added to the mixture, and the resulting mixture was stirred for another 10 minutes. Subsequently, 377 parts by weight of tetramethoxysilane as component (C) was added thereto, and the resulting mixture was stirred at room temperature for 1.5 hours to obtain a composition having gas-barrier properties. By using this composition, and heating a substrate coated therewith, in the same manner as in Example 1, at a low temperature (110° C.) for 2 hours to prevent coloration or deformation of the substrate, a coating film was obtained.

The composition prepared by the method described above was coated on a polycarbonate film (Panlite film PC-2151 manufactured by Teijin Chemicals, Ltd.) having a thickness of 130 μm using a bar coater, so that the thickness after curing was about 1.5 μm. Then, the substrate was heated at a low temperature (110° C.) for 2 hours to prevent coloration or deformation of the substrate, thus to obtain a coating film.

Example 14

1600 parts by weight of an aqueous solution of 5 wt % PVA as component (A), 400 parts by weight of an aqueous solution of 5 wt % PAA as component (B), 11.6 parts by weight of dicyanodiamide as component (E), and 296 parts by weight of an aqueous dispersion of 20% by weight of silica particles (ST-O manufactured by Nissan Chemical Industries, Ltd.) were mixed, and the mixture was stirred at room temperature for 10 minutes. Subsequently, 377 parts by weight of tetramethoxysilane as component (C) was added thereto, and the resulting mixture was stirred at room temperature for 1.5 hours to obtain a composition having gas-barrier properties. By using this composition, and heating a substrate coated therewith, in the same manner as in Example 6, at a low temperature (110° C.) for 2 hours to prevent coloration or deformation of the substrate, a coating film was obtained.

Comparative Example 1

While stirring 1000 parts by weight of an aqueous solution of 5 wt % PAA, 38 parts by weight of a solution containing 3-aminopropyltrimethoxysilane as component (D) and ethanol mixed at a weight ratio of 1:9 was added dropwise thereto. Then the mixture was stirred at room temperature for 30 minutes. Subsequently, 1000 parts by weight of an aqueous solution of 5 wt % PVA was added to the mixture, and the resulting mixture was stirred for another 10 minutes. Subsequently, 310 parts by weight of tetramethoxysilane as component (C) was added thereto, and the resulting mixture was stirred at room temperature for 1.5 hours to obtain a composition having gas-barrier properties. By using this composition, and heating a substrate coated therewith, in the same manner as in Example 1, at a low temperature (110° C.) for 2 hours to prevent coloration or deformation of the substrate, a coating film was obtained.

Comparative Example 2

600 parts by weight of an aqueous solution of 5 wt % PVA as component (A), and 1400 parts by weight of an aqueous solution of 5 wt % PAA as component (B) were mixed. The mixture was stirred at room temperature for 10 minutes to obtain a composition having gas-barrier properties. By using this composition, and heating a substrate coated therewith, in the same manner as in Example 1, at a low temperature (120° C.) for 1 hours to prevent coloration or deformation of the substrate, a coating film was obtained.

Comparative Example 3

While stirring 1400 parts by weight of an aqueous solution of 5 wt % PAA, 52 parts by weight of a solution containing 3-aminopropyltrimethoxysilane as component (D) and ethanol mixed at a weight ratio of 1:9 was added dropwise thereto. Then the mixture was stirred at room temperature for 30 minutes. Subsequently, 600 parts by weight of an aqueous solution of 5 wt % PVA was added to the mixture, and the resulting mixture was stirred for another 10 minutes. The result was referred to as Solution c31. Meanwhile, to 377 parts by weight of tetramethoxysilane as component (C), 89 parts by weight of a 0.06 N aqueous solution of nitric acid was added, and the resulting mixture was stirred at room temperature for 1.5 hours. The result was referred to as Solution c32.

The Solution c31 and Solution c32 were mixed, and the mixture was stirred at room temperature for 1.5 hours to obtain a composition. By using this composition, and heating a substrate coated therewith, in the same manner as in Example 1, at a low temperature (110° C.) for 2 hours to prevent coloration or deformation of the substrate, a coating film was obtained.

Comparative Example 4

1400 parts by weight of an aqueous solution of 5 wt % PAA, and 600 parts by weight of an aqueous solution of 5 wt % PVA were mixed. This mixture was referred to as Solution c41. Meanwhile, to 252 parts by weight of tetramethoxysilane as component (C), 60 parts by weight of a 0.06 N aqueous solution of nitric acid was added, and the resulting mixture was stirred at room temperature for 1 hour. The result was referred to as Solution c42. The Solution c41 and Solution c42 were mixed, and the resulting mixture was stirred at room temperature for 2 hours to obtain a composition. By using this composition, and heating the substrate in the same manner as in Example 1, at a low temperature (120° C.) for 1 hour to prevent coloration or deformation of the substrate, a coating film was obtained.

Comparative Example 5

While stirring 1400 parts by weight of a 5 wt % solution having PAA, 52 parts by weight of a solution containing 3-aminopropyltrimethoxysilane as component (D) and ethanol mixed at a weight ratio of 1:9 was added dropwise thereto. Then the mixture was stirred at room temperature for 30 minutes. Subsequently, 600 parts by weight of an aqueous solution of 5 wt % PVA was added to the mixture, and the resulting mixture was stirred for another 10 minutes. The result was referred to as Solution c51. Meanwhile, to 252 parts by weight of tetramethoxysilane as component (C), 60 parts by weight of a 0.06 N aqueous solution of nitric acid was added, and the resulting mixture was stirred at room temperature for 1 hours. The result was referred to as Solution c52.

The Solution c51 and Solution c52 were mixed, and the mixture was stirred at room temperature for 2 hours to obtain a composition. By using this composition, and heating a substrate coated therewith, in the same manner as in Example 1, at a low temperature (110° C.) for 2 hours to prevent coloration or deformation of the substrate, a coating film was obtained.

Comparative Example 6

1600 parts by weight of an aqueous solution of 5 wt % PVA as component (A), and 400 parts by weight of an aqueous solution of 5 wt % PAA as component (B) are mixed. The mixture was stirred at room temperature for 10 minutes to obtain a composition having gas-barrier properties. By using this composition, and heating a substrate coated therewith, in the same manner as in Example 1, at a low temperature (110° C.) for 2 hours to prevent coloration or deformation of the substrate, a coating film was obtained.

Comparative Example 7

1600 parts by weight of an aqueous solution of 5 wt % PVA as component (A), and 400 parts by weight of an aqueous solution of 5 wt % PAA as component (B) are mixed. The mixture was stirred at room temperature for 10 minutes. Subsequently, 308 parts by weight of tetramethoxysilane as component (C) was added thereto, and the resulting mixture was stirred at room temperature for 1.5 hours to obtain a composition having gas-barrier properties. By using this composition, and heating a substrate coated therewith, in the same manner as in Example 1, at a low temperature (110° C.) for 2 hours to prevent coloration or deformation of the substrate, a coating film was obtained.

Comparative Example 8

1400 parts by weight of an aqueous solution of 5 wt % PVA as component (A), and 600 parts by weight of an aqueous solution of 5 wt % PAA as component (B) are mixed. The mixture was stirred at room temperature for 10 minutes. Subsequently, 303 parts by weight of tetramethoxysilane as component (C) was added thereto, and the resulting mixture was stirred at room temperature for 1.5 hours to obtain a composition having gas-barrier properties. By using this composition, and heating a substrate coated therewith, in the same manner as in Example 1, at a low temperature (110° C.) for 2 hours to prevent coloration or deformation of the substrate, a coating film was obtained.

The composition of components in the above Examples and Comparative Examples are presented, together with the $SiO_2$ (silica) content, in Table 1 through Table 5. In addition, the silica content represents the proportion of silica contained in the coating film, and was calculated by the following method.

Calculating Method of Silica ($SiO_2$) Content

The silica content was calculated under an assumption that 100% of TMOS, the component (C) in the above Examples and Comparative Examples, reacted to become $SiO_2$. For example, the calculation was performed under an assumption that when the component (C) was TMOS, 100% thereof reacted to become $SiO_2$. Thus, from TMOS: Mw=152

$SiO_2$: Mw=60, $SiO_2$/TMOS=60/152=0.395.

That is, the value obtained by multiplying the amount of TMOS added by 0.395 is the $SiO_2$ content in the film. From this, the silica ($SiO_2$) content was calculated from the following formula:

Silica ($SiO_2$) content=[TMOS]*0.395/([A]+[B]+
([TMOS]*0.395)+[E]+([D]))

provided that in the above formula, [A], [B], [TMOS], [E] and [D] represent the parts by weight of the respective components.

For example, in the case of Example 1, the silica ($SiO_2$) content is:

Silica ($SiO_2$) content=(355*0.395)/(50+50+
(355*0.395)+3.8+14.5)*100=54.

[Evaluation of Coating Film]

For the coating films obtained in the above Examples and Comparative Examples, evaluation of properties was carried out by the following methods. The evaluation results are presented in Table 1 through Table 5.

[Measurement of Oxygen Permeability]

The oxygen permeability was measured at 23° C. in an atmosphere of 90% $R^H$ using an oxygen permeability measuring device (Oxtran 2/21 MH manufactured by Mocon, Inc.). A sample of coated PET film was used for the measurement.

[Measurement of Hardness]

According to JIS K5400, the pencil hardness test was performed. A sample of coated glass substrate was used for the measurement. However, for Example 14, a sample of coated polycarbonate substrate was used.

[Transparency]

A sample prepared by forming a coating film of 1.5 µm on a PET film of 50 µm (Cosmoshine A4100 manufactured by Toyobo Co., Ltd.) was used for an evaluation with naked eyes. Being transparent as used herein refers to the status that light is not scattered to cause clouding. In addition, for all samples, coloration and deformation of the coating films were not recognized.

Furthermore, for some of the samples, the parallel light transmission was measured with an ultraviolet-visible ray spectrophotometer (MaltiSpec-1500 manufactured by Shimadzu Corp.), and a transmission of 87% or greater at a wavelength of 500 nm was classified as transparent, while a transmission of less than 87% was classified as opaque.

A sample containing colloidal silica (Example 14) exhibited even more excellent gas-barrier properties.

Also, as shown in Table 1 and Table 2, when the component (E) is added, high gas (oxygen) barrier properties can be exhibited with less silica content. When the silica content is high, cracking or curling of the coating film may occur. On the other hand, a coating film having a less silica content and consisting of the components (A), (B) and (C) (Comparative Example 4) had low gas-barrier properties under high humidity conditions (90% RH) and abrasion resistance, compared with the coating films of the Examples.

In addition, the coating films obtained from the above Examples had excellent water resistance.

Meanwhile, a coating film consisting of the components (A) and (B) (Comparative Example 2) had low gas-barrier properties under high humidity conditions (90% RH) and abrasion resistance, compared with the coating films of the Examples. On the other hand, a hard coat not containing the component (C) (Comparative Example 6) was found to have lower abrasion resistance than the coating films of the Examples.

TABLE 1

(Silica content: ≧54% (excluding Comparative Example 2))

| | | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Component (A) | PVA | 50 | 50 | 30 | 30 | 50 | 30 | 30 |
| | (Aqueous solution of 5% PVA) | 1000 | 1000 | 600 | 600 | 1000 | 600 | 600 |
| Component (B) | PAA | 50 | 50 | 70 | 70 | 50 | 70 | 70 |
| | (Aqueous solution of 5% PAA) | 1000 | 1000 | 1400 | 1400 | 1000 | 1400 | 1400 |
| Component (C) | Tetramethoxysilane | 355 | 355 | 377 | 377 | 310 | 0 | 377 |
| Component (D) | APTMOS | 3.8 | 0 | 5.2 | 0 | 3.8 | 0 | 5.2 |
| | (10% APTMOS) | 38 | 0 | 52 | 0 | 38 | 0 | 52 |
| Component (E) | Dicyanodiamide | 14.5 | 14.5 | 22.8 | 22.8 | 0 | 0 | 0 |
| Silica ($SiO_2$) content (wt %/coatings) | | 54 | 55 | 54 | 55 | 54 | 0 | 59 |
| Transparency | | transparent | clouding | transparent | clouding | transparent | transparent | transparent |
| Oxygen Permeability 23° C. 90% RH (cc/$m^2$ · day · atm) | | 0.3 | 0.2 | 0.4 | 0.2 | 0.7 | 28 | 14 |
| Hardness substrate: glass | | 8H | 8H | 8H | 8H | 8H | 4H | 8H |

The results of transparency measurement are presented below.

PET film only: 90% (transparent)

Example 2: 86% (opaque)

Example 3: 90% (transparent)

Example 4: 83% (opaque)

From the evaluation results presented in Table 1 through Table 5, it was found that the coating film using a composition having gas-barrier properties which contains a water-soluble polymer having hydroxyl groups (A), a water-soluble polymer having carboxyl groups (B), a metal alkoxide and/or a hydrolysis condensate thereof (C) and an esterification catalyst (E) as the main components, has excellent transparency, gas-barrier properties under high humidity conditions (90% RH), and abrasion resistance.

Furthermore, when an excess of PVA as the component (A) was mixed with PAA as the component (B), the gas-barrier properties of the resulting coating film could be further enhanced, compared with the case where an excess of PAA was mixed.

TABLE 2

(Silica content: 42 to 50%)

| | | Ex. 5 | Comp. Ex. 4 | Comp. Ex. 5 |
|---|---|---|---|---|
| Component (A) | PVA | 30 | 30 | 30 |
| | (Aqueous solution of 5% PVA) | 600 | 600 | 600 |
| Component (B) | PAA | 70 | 70 | 70 |
| | (Aqueous solution of 5% PAA) | 1400 | 1400 | 1400 |
| Component (C) | Tetramethoxysilane | 252 | 252 | 252 |
| Component (D) | APTMOS | 5.2 | 0 | 5.2 |
| | (10% APTMOS) | 52 | 0 | 52 |
| Component (E) | Dicyanodiamide | 34 | 0 | 0 |
| Silica ($SiO_2$) content (wt %/coatings) | | 42 | 50 | 49 |
| Transparency | | transparent | clouding | transparent |
| Oxygen Permeability 23° C. 90% RH (cc/$m^2$ · day · atm) | | 5.0 | 21 | 19 |
| Hardness substrate: glass | | 8H | 4H | 9H |

TABLE 3

|  |  | Ex. 6 | Ex. 7 | Ex. 14 | Comp. Ex. 6 | Comp. Ex. 7 | Comp. Ex. 8 |
|---|---|---|---|---|---|---|---|
| Component (A) | PVA | 80 | 70 | 80 | 80 | 80 | 70 |
|  | (Aqueous solution of 5% PVA) | 1600 | 1400 | 1600 | 1600 | 1600 | 1400 |
| Component (B) | PAA | 20 | 30 | 20 | 20 | 20 | 30 |
|  | (Aqueous solution of 5% PAA) | 400 | 600 | 400 | 400 | 400 | 600 |
| Component (C) | Tetramethoxysilane | 377 | 368 | 377 | 0 | 308 | 303 |
| Component (D) | APTMOS | 0 | 0 | 0 | 0 | 0 | 0 |
|  | (10% APTMOS) | 0 | 0 | 0 | 0 | 0 | 0 |
| Component (E) | Dicyanodiamide | 11.6 | 22.8 | 11.6 | 0 | 0 | 0 |
| Silica particles (20% aqueous dispersion) |  | 0 | 0 | 60 | 0 | 0 | 0 |
|  |  | 0 | 0 | 296 | 0 | 0 | 0 |
| Silica ($SiO_2$) content (wt %/coatings) |  | 57 | 54 | 65 | 0 | 55 | 54 |
| Transparency |  | transparent | transparent | transparent | transparent | transparent | transparent |
| Oxygen permeability 23° C. 90% RH ($cc/m^2 \cdot day \cdot atm$) |  | 0.2 | 0.1 | <0.1 | 22 | 2.0 | 0.4 |
| Hardness substrate: glass |  | 8H | 8H | 4H* | 4H | 8H | 8H |

(*polycarbonate)

TABLE 4

|  | Ex. 3 | Ex. 8 | Ex. 9 | Ex. 10 | Ex. 11 |
|---|---|---|---|---|---|
| Reaction route | (i) | (ii) | (iii) | (iv) | (vii) |
| Transparency | transparent | transparent | transparent | transparent | transparent |
| Oxygen permeability ($cc/m^2 \cdot day$) | 0.4 | 0.8 | 0.5 | 0.3 | 3 |

Reaction route:
(i): Mix a solution containing (A), (B), (D) and (E), and a solution containing (C)
(ii): Mix a solution containing (A), (B) and (E), and a solution containing (C) and (D)
(iii): Mix a solution containing (A), (B) and (D), and a solution containing (C) and (E)
(iv): Mix a solution containing (A) and (B), and a solution containing (C), (D) and (E)
(vii): Mix a solution containing (A), (B) and (D), and (E), and a solution prepared by adding a catalyst and water to (C) and stirring for a certain length of time
Sample composition: the same composition as that of Example 3

TABLE 5

|  | Ex. 3 | Ex. 12 | Ex. 13 |
|---|---|---|---|
| Substrate film | PET | Cycloolefin copolymer | Polycarbonate |
| Transparency | transparent | transparent | transparent |
| Oxygen permeability ($cc/m^2 \cdot day$) | 0.4 | 2.7 | 4 |

The present invention also includes the following embodiments.

(1-1) A composition for gas-barrier hard coat (composition having gas-barrier properties), comprising a water-soluble polymer having hydroxyl groups (A), a water-soluble polymer having carboxylic acids (carboxyl groups) (B), a metal alkoxide and/or a hydrolysis condensate thereof (C), and a compound having one or more of a functional group capable of forming a bond with a metal oxide, and one or more of a functional group capable for forming a bond with a carboxyl group respectively in one molecule (D), wherein the weight ratio of (A) and (B) is 97/3 to 3/97, and from 1 part by weight to 400 parts by weight of (C) both inclusive and from 1 part by weight to 20 parts by weight of (D) both inclusive, relative to 100 parts by weight of a mixture of (A) and (B), are contained.

(1-2) The composition for gas-barrier hard coat described in (1-1), which further comprises a solvent.

(1-3) A composition for gas-barrier hard coat, comprising the composition for gas-barrier hard coat described in (1-1) and an esterification catalyst (E), wherein from 0.01 parts by weight to 100 parts by weight of (E) both inclusive, relative to 100 parts by weight of a mixture of (A) and (B), is contained.

(1-4) The composition for gas-barrier hard coat described in (1-3), which further comprises a solvent.

(1-5) The composition for gas-barrier hard coat described in (1-2) or (1-3), wherein the esterification catalyst (E) is a compound selected from metal salts of inorganic acids, metal salts of organic acids, organic phosphorus compounds, carboxylic acids and derivatives thereof, sulfonic acids and derivatives thereof, organic ammonium salts or pyridinium salts of mineral acids, cyano group-containing organic compounds, isocyano group-containing organic compounds, ketene derivatives, dichalcogenide compounds, cyanuric chloride, carbonyldiimidazole, hexachloroacetone, and 2,4,6-trinitro-1-chlorobenzene.

(1-6) The composition for gas-barrier hard coat described in any one of (1-1) to (1-5), wherein the water-soluble polymer having hydroxyl groups (A) is at least one compound selected from polyvinyl alcohol or ethylene-vinyl alcohol copolymers, saccharides and celluloses.

(1-7) The composition for gas-barrier hard coat described in any one of (1-1) to (1-5), wherein the water-soluble polymer having carboxyl groups (B) is poly(meth)acrylic acid or a partial neutralization product thereof.

(1-8) The composition for gas-barrier hard coat described in any one of (1-1) to (1-7), wherein the metal alkoxide and/or the hydrolysis condensate of metal alkoxide is a compound selected from silica, alumina, titania and zirconia.

(1-9) A composition for gas-barrier hard coat, comprising from 1 part by weight to 100 parts by weight both inclusive of metal oxide particles having an average particle size of 100 nm or less, relative to 100 parts by weight of the composition for gas-barrier hard coat described in (1-1) and/or (1-3).

(1-10) The composition for gas-barrier hard coat described in (1-9), further containing a solvent.

(1-11) The composition for gas-barrier hard coat described in any one of (1-1) to (1-10), wherein the metal alkoxide and/or a hydrolysis condensate thereof (C) is converted to a metal oxide through a sol-gel reaction upon addition of water and catalyst.

(1-12) A method for producing a gas-barrier hard coat obtained by forming a film-like product of the composition for gas-barrier hard coat described in any one of (1-1) to (1-11), and thermally treating the film-like product.

(1-13) A gas-barrier hard coat (coating film) produced by the method described in (1-12), which has excellent transparency and abrasion resistance.

(1-14) A gas-barrier layered material (layered material) including at least one layer of the gas-barrier hard coat described in (1-13).

(2-1) A composition for hard coat (composition having gas-barrier properties), comprising a water-soluble polymer having hydroxyl groups (A), a water-soluble polymer having carboxylic acids (carboxyl groups) (B), a metal alkoxide and/or a hydrolysis condensate thereof (C), and an esterification catalyst (E), wherein the weight ratio of (A) and (B) is 60/40 to 95/5, and from 1 part by weight to 400 parts by weight of (C) both inclusive and from 0.01 part by weight to 100 parts by weight of (E) both inclusive, relative to 100 parts by weight of a mixture of (A) and (B), are contained.

(2-2) The composition for hard coat described in (2-1), wherein the water-soluble polymer having hydroxyl groups (A) is at least one compound selected from polyvinyl alcohol or ethylene-vinyl alcohol copolymers, saccharides and celluloses.

(2-3) The composition for hard coat described in (2-1) or (2-2), wherein the water-soluble polymer having carboxylic acids (B) is poly(meth)acrylic acid or a partial neutralization product thereof.

(2-4) The composition for hard coat described in any one of (2-1) to (2-3), wherein the metal alkoxide and/or the hydrolysis condensate of metal alkoxide is a compound selected from silica, alumina, titania and zirconia.

(2-5) The composition for hard coat described in any one of (2-1) to (2-4), wherein the esterification catalyst (E) is a compound selected from metal salts of inorganic acids, metal salts of organic acids, organic phosphorus compounds, carboxylic acids and derivatives thereof, sulfonic acids and derivatives thereof, organic ammonium salts or pyridinium salts of mineral acids, cyano group-containing organic compounds, isocyano group-containing organic compounds, ketene derivatives, dichalcogenide compounds, cyanuric chloride, carbonyldiimidazole, hexachloroacetone, and 2,4,6-trinitro-1-chlorobenzene.

(2-6) A composition for hard coat, comprising from 1 part by weight to 100 parts by weight both inclusive of metal oxide particles having an average particle size of 100 nm or less, relative to 100 parts by weight of the composition for hard coat described in (2-1).

(2-7) The composition for hard coat described in any one of (2-1) to (2-6), wherein the metal alkoxide and/or a hydrolysis condensate (C) thereof is converted to a metal oxide through a sol-gel reaction upon addition of water and catalyst.

(2-8) A method for producing a hard coat obtained by forming a film-like product of the composition for hard coat described in any one of (2-1) to (2-7), and thermally treating the film-like product.

(2-9) A hard coat (coating film) produced by the method described in (2-8).

(2-10) A hard coat layered material (layered material) including at least one layer of the hard coat described in (2-9).

The invention claimed is:

1. A method for producing a composition having gas-barrier properties composition having gas-barrier properties comprising:
   a water-soluble polymer having hydroxyl groups (A),
   a water-soluble polymer having carboxyl groups (B),
   a metal alkoxide and/or a hydrolysis condensate thereof (C),
   an esterification catalyst (E), and
   a compound having one or more of a functional group capable of forming a bond with a metal oxide, and one or more of a functional group capable of forming a bond with a carboxyl group respectively in one molecule (D),
   wherein the weight ratio of the component (A) and the component (B) is 97/3 to 3/97, and the component (C) is contained in the amount of not less than 1 part by weight and not more than 450 parts by weight, while the component (E) is contained in the amount of not less than 0.01 part by weight and not more than 100 parts by weight, relative to 100 parts by weight of a mixture of the component (A) and the component (B),
   wherein the component (E) is dicyanodiamide, and
   wherein the component (D) is contained in the amount of not less than 1 part by weight and not more than 20 parts by weight relative to 100 parts by weight of a mixture of the component (A) and the component (B),
   comprising:
   mixing the component (A), the component (B), the component (D) and the component (E) in a solvent; and
   mixing the mixture liquid obtained from the previous step and the component (C),
   wherein during the mixing the mixture liquid and the component (C), a hydrolysis condensation reaction of the component (C) is conducted.

2. A method for producing a composition having gas-barrier properties composition having gas-barrier properties comprising:
   a water-soluble polymer having hydroxyl groups (A),
   a water-soluble polymer having carboxyl groups (B),
   a metal alkoxide and/or a hydrolysis condensate thereof (C),
   an esterification catalyst (E), and
   a compound having one or more of a functional group capable of forming a bond with a metal oxide, and one or more of a functional group capable of forming a bond with a carboxyl group respectively in one molecule (D),
   wherein the weight ratio of the component (A) and the component (B) is 97/3 to 3/97, and the component (C) is contained in the amount of not less than 1 part by weight and not more than 450 parts by weight, while the component (E) is contained in the amount of not less than 0.01 part by weight and not more than 100 parts by weight, relative to 100 parts by weight of a mixture of the component (A) and the component (B),
   wherein the component (E) is dicyanodiamide, and
   wherein the component (D) is contained in the amount of not less than 1 part by weight and not more than 20 parts by weight relative to 100 parts by weight of a mixture of the component (A) and the component (B), comprising:
mixing the component (A), the component (B) and the component (E) in a solvent; and
mixing the mixture liquid obtained from the previous step, the component (D) and the component (C),
wherein during the mixing the mixture liquid, the component (D) and the component (C), a hydrolysis condensation reaction of the component (C), and a reaction between the component (D) and at least one of a metal oxide and a carboxyl group are conducted.

3. A method for producing a composition having gas-barrier properties composition having gas-barrier properties comprising:
a water-soluble polymer having hydroxyl groups (A),
a water-soluble polymer having carboxyl groups (B),
a metal alkoxide and/or a hydrolysis condensate thereof (C),
an esterification catalyst (E), and
a compound having one or more of a functional group capable of forming a bond with a metal oxide, and one or more of a functional group capable of forming a bond with a carboxyl group respectively in one molecule (D),
wherein the weight ratio of the component (A) and the component (B) is 97/3 to 3/97, and the component (C) is contained in the amount of not less than 1 part by weight and not more than 450 parts by weight, while the component (E) is contained in the amount of not less than 0.01 part by weight and not more than 100 parts by weight, relative to 100 parts by weight of a mixture of the component (A) and the component (B),
wherein the component (E) is dicyanodiamide, and
wherein the component (D) is contained in the amount of not less than 1 part by weight and not more than 20 parts by weight relative to 100 parts by weight of a mixture of the component (A) and the component (B),
comprising:
mixing the component (A), the component (B) and the component (D) in a solvent; and
mixing the mixture liquid obtained from the previous step, the component (E) and the component (C),
wherein during the mixing the mixture liquid, the component (E) and the component (C), a hydrolysis condensation reaction of the component (C) is conducted.

4. A method for producing a composition having gas-barrier properties composition having gas-barrier properties comprising:
a water-soluble polymer having hydroxyl groups (A),
a water-soluble polymer having carboxyl groups (B),
a metal alkoxide and/or a hydrolysis condensate thereof (C),
an esterification catalyst (E), and
a compound having one or more of a functional group capable of forming a bond with a metal oxide, and one or more of a functional group capable of forming a bond with a carboxyl group respectively in one molecule (D),
wherein the weight ratio of the component (A) and the component (B) is 97/3 to 3/97, and the component (C) is contained in the amount of not less than 1 part by weight and not more than 450 parts by weight, while the component (E) is contained in the amount of not less than 0.01 part by weight and not more than 100 parts by weight, relative to 100 parts by weight of a mixture of the component (A) and the component (B),
wherein the component (E) is dicyanodiamide, and
wherein the component (D) is contained in the amount of not less than 1 part by weight and not more than 20 parts by weight relative to 100 parts by weight of a mixture of the component (A) and the component (B),
comprising:
mixing the component (A) and the component (B) in a solvent; and
mixing the mixture liquid obtained from the previous step, the component (D), the component (E) and the component (C),
wherein during the mixing the mixture liquid, the component (D), the component (E) and the component (C), a hydrolysis condensation reaction of the component (C), and a reaction between the component (D) and at least one of a metal oxide and a carboxyl group are conducted.

* * * * *